United States Patent
Yokoo

(10) Patent No.: US 9,146,298 B2
(45) Date of Patent: Sep. 29, 2015

(54) WIRELESS COMMUNICATION SYSTEM, SLAVE STATION DEVICE, MASTER STATION DEVICE, AND WIRELESS COMMUNICATION SYSTEM CONTROL METHOD

(75) Inventor: Kaoru Yokoo, Yokosuka (JP)

(73) Assignee: FUJITSU LIMITED, Kawasaki (JP)

( * ) Notice: Subject to any disclaimer, the term of this patent is extended or adjusted under 35 U.S.C. 154(b) by 175 days.

(21) Appl. No.: 13/483,617

(22) Filed: May 30, 2012

(65) Prior Publication Data

US 2013/0021927 A1 Jan. 24, 2013

(30) Foreign Application Priority Data

Jul. 22, 2011 (JP) .................................. 2011-161374

(51) Int. Cl.
- G01S 5/02 (2010.01)
- H04W 72/04 (2009.01)
- H04W 64/00 (2009.01)

(52) U.S. Cl.
CPC ............. G01S 5/0289 (2013.01); G01S 5/0252 (2013.01); H04W 64/00 (2013.01)

(58) Field of Classification Search
CPC . H04W 72/0406; H04W 24/02; H04W 64/00; G01S 5/0289
See application file for complete search history.

(56) References Cited

U.S. PATENT DOCUMENTS

| | | | |
|---|---|---|---|
| 6,665,315 B1 * | 12/2003 | Karasawa | ....................... 370/508 |
| 7,660,591 B1 | 2/2010 | Krishnakumar et al. | |
| 2002/0168943 A1 | 11/2002 | Callaway, Jr. et al. | |
| 2008/0025233 A1 | 1/2008 | Otsuka | |
| 2008/0032727 A1 * | 2/2008 | Stephenson et al. | ........... 455/513 |
| 2008/0212545 A1 | 9/2008 | Lau et al. | |
| 2008/0291890 A1 | 11/2008 | Yuasa | |
| 2008/0305817 A1 * | 12/2008 | Namekata et al. | ............. 455/507 |
| 2010/0285814 A1 | 11/2010 | Price | |
| 2010/0302970 A1 | 12/2010 | Lau et al. | |

FOREIGN PATENT DOCUMENTS

| | | |
|---|---|---|
| JP | 8-172663 | 7/1996 |
| JP | 2006-343161 | 12/2006 |

(Continued)

OTHER PUBLICATIONS

Extended European Search Report issued Oct. 24, 2012 in corresponding European Patent Application No. 12169870.8.

(Continued)

*Primary Examiner* — Jianye Wu
(74) *Attorney, Agent, or Firm* — Staas & Halsey LLP

(57) ABSTRACT

A wireless communication system that includes a hub and multiple nodes is provided. The nodes include a wireless communication control unit that acquires, during a predetermined communication time period, a signal transmitted to the hub by a node; an RSSI calculating unit that calculates propagation information from the signal acquired by the wireless communication control unit; and an RSSI table creating unit that transmits the calculated propagation information to the hub. The hub includes a wireless communication control unit that receives propagation information transmitted by each of the nodes and an RSSI table aggregating unit that aggregates the received propagation information.

14 Claims, 13 Drawing Sheets

(56) References Cited

FOREIGN PATENT DOCUMENTS

| | | |
|---|---|---|
| JP | 2008-035375 | 2/2008 |
| JP | 2008-294747 | 12/2008 |
| JP | 2009-229175 | 10/2009 |
| JP | 2010-511324 | 4/2010 |

OTHER PUBLICATIONS

Japanese Patent Office Action issued Jan. 6, 2015 in corresponding Japanese Patent Application No. 2011-161374. Partial.

Japanese Office Action mailed Jun. 23, 2015 in corresponding Japanese Patent Application No. 2011-161374.

* cited by examiner

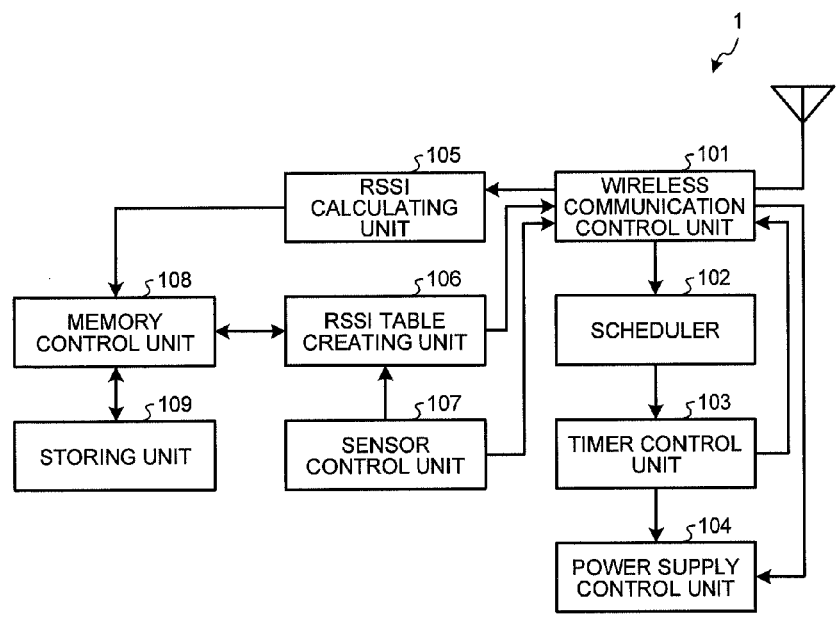

$$\begin{bmatrix} 0 & S01 & S02 & S03 & \cdots & S0,n-1 & S0n \\ S10 & 0 & S12 & S13 & \cdots & S1,n-1 & S1n \\ S20 & 0 & 0 & S23 & \cdots & S2,n-1 & S2n \\ S30 & 0 & 0 & 0 & \cdots & S3,n-1 & S3n \\ \vdots & \vdots & \vdots & \vdots & \ddots & \vdots & \vdots \\ Sn-1,0 & 0 & 0 & 0 & \cdots & 0 & Sn-1,n \\ Sn0 & 0 & 0 & 0 & \cdots & 0 & 0 \end{bmatrix}$$

410

WIRELESS COMMUNICATION SYSTEM, SLAVE STATION DEVICE, MASTER STATION DEVICE, AND WIRELESS COMMUNICATION SYSTEM CONTROL METHOD

CROSS-REFERENCE TO RELATED APPLICATION

This application is based upon and claims the benefit of priority of the prior Japanese Patent Application No. 2011-161374, filed on Jul. 22, 2011, the entire contents of which are incorporated herein by reference.

FIELD

The embodiments discussed herein are directed to a wireless communication system, a slave station device, a master station device, and a wireless communication system control method.

BACKGROUND

In communication systems, a network topology, such as a star, tree, or mesh topology, is used. Furthermore, in communication systems, the components of a network, such as computers or hubs, are called nodes.

In a mesh network, in which nodes communicates equally with each other, nodes adjacent to each other communicate. Accordingly, in a mesh network, when compared with a star network or tree network, it is easy to acquire the received electric field indication (RSSI) of each transmission signal from each node. However, in a mesh network, it is difficult to estimate when a node will communicate. Accordingly, nodes need to be in the state such that they can always communicate and thus it is difficult to put the entire network to sleep, which makes it difficult to implement low electrical power consumption.

In contrast, in a star or tree network, a higher level node manages a lower level node. Accordingly, it is easy to synchronize nodes in the network, which in turn makes it easy to implement low electrical power consumption network with a star or tree topology.

However, in a star or tree network, each node only communicates with a node that corresponds to a master station located higher than the subject node when the subject node is used as a slave station or only communicates with a node that corresponds to a slave station located lower than the subject node when the subject node is used as a master station. For example, a slave station located at the end of the star or tree only communicates with a hub that corresponds to a node functioning as a master station. Specifically, communication is not directly performed between nodes that are both functioning as slave stations of a hub. Accordingly, for the slave stations of the hub, it is difficult to obtain RSSI values for slave stations other than the subject hub. Therefore, it is difficult to use, in a star or tree communication system, a positioning algorithm that is a technology used to estimate the distance between slave stations on the basis of the RSSI value between the slave stations and then estimate the location of each slave station by using the estimated distance.

There is a proposed technology for use in conventional mesh network technologies for obtaining the distance between wireless communication terminals from the indications received from communications between wireless communication terminals, for comparing the distance with the result of the positioning performed using GPS, and for correcting the positioning results obtained by the wireless communication terminals (see, for example, Japanese Laid-open Patent Publication No. 2006-343161). Furthermore, there is a conventional technology for obtaining received electric field indications by receiving, at a base station, a response signal from each mobile station in response to a call from a central office and for estimating the location of the mobile stations from the obtained received electric field indications (see, for example, Japanese Laid-open Patent Publication No. 08-172663).

However, as described above, it is difficult to implement low electrical power consumption in a mesh network. Accordingly, for example, if a transmitter used as a slave station is attached to a cow in a field, the battery in the transmitter soon runs down and thus information may not be obtained. Furthermore, in the conventional technology for obtaining received electric field indications by receiving, at a base station, a response signal from each mobile station in response to a call from a central office, because the distance between mobile stations is not obtained, the accuracy with which the location of the mobile stations are specified becomes low.

SUMMARY

According to an aspect of an embodiment of the invention, a wireless communication system includes a master station and multiple slave stations, wherein each of the slave stations includes a different-slave-station signal-acquiring unit that acquires, during a predetermined communication time period, a signal transmitted to the master station by a different slave station that is a different one of the slave stations, a propagation information acquiring unit that calculates, from the signal acquired by the different-slave-station signal-acquiring unit, propagation information on propagation between the different slave station and a subject slave station, and a propagation information sending unit that transmits the calculated propagation information to the master station, and the master station includes a propagation information receiving unit that receives propagation information transmitted by each of the slave stations, and a propagation information aggregating unit that aggregates the received propagation information.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 2 is a block diagram illustrating the function of a node according to the first embodiment;

FIG. 3 is a schematic diagram illustrating an example of an RSSI table;

DESCRIPTION OF EMBODIMENTS

Preferred embodiments of the present invention will be explained with reference to accompanying drawings. The wireless communication system, the slave station device, the master station device, and the wireless communication system control method disclosed in the present invention is not limited to the embodiments described below.

[a] First Embodiment

Figure 1:
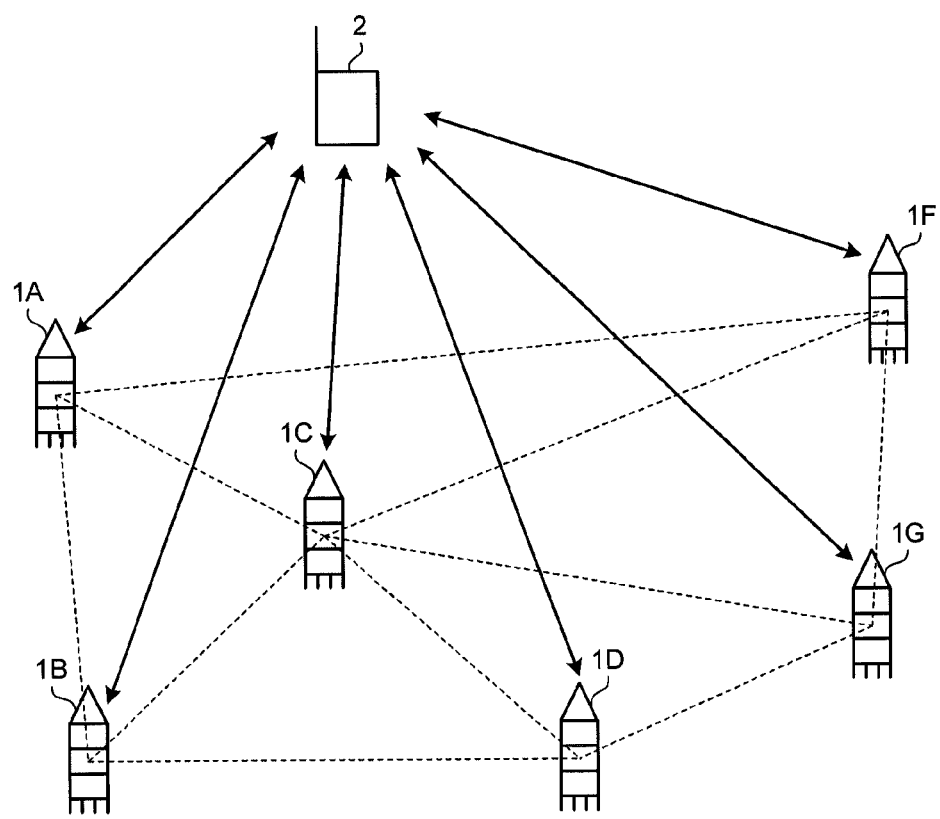
FIG. 1 is a schematic diagram illustrating the overall configuration of a wireless communication system according to a first embodiment.

FIG. 1 is a schematic diagram illustrating the overall configuration of a wireless communication system according to a first embodiment. As illustrated in FIG. 1, a wireless communication system according to a first embodiment includes nodes 1A to 1G, which are slave stations in the wireless communication system, and a hub 2.

In a description below, a slave station in the wireless communication system is referred to as a "node". Furthermore, in FIG. 1, six nodes are illustrated; however, the number of nodes is not limited thereto. In FIG. 1, only the nodes 1A to 1G are illustrated; however, in practice, it is assumed that the nodes 1A to 1G represent n nodes.

A node number, i.e., an identifier, is allocated to each of the nodes 1A to 1G. In the first embodiment, for example, the nodes 1A to 1G are attached to cows, pigs, or the like and obtain the ecological information, such as a pulse or a body temperature of a cow or a pig. In the first embodiment, it is assumed that numerals 1 to n are allocated to n nodes, respectively, as a sequence number. In the description below, a node having a node number i (i=1, 2, . . . , and n) that is used as an identifier is sometimes referred to as a node #i.

The hub 2 is a master station with respect to the nodes 1A to 1G in the wireless communication system according to the first embodiment.

It is assumed that the wireless communication system according to the first embodiment has a star topology. Specifically, the nodes 1A to 1G communicate with the hub 2 and do not directly communicate with each other. In FIG. 1, the arrows indicated by the solid line illustrated from each of the nodes 1A to 1G to the hub 2 indicate that wireless communications are performed among the nodes 1A to 1G and the hub 2. In contrast, because there are no solid line arrows among the nodes 1A to 1G, communications are not performed among the nodes 1A to 1G each other. Furthermore, the dotted lines connecting each of the nodes 1A to 1G indicate the distance between each of the nodes 1A to 1G. In the first embodiment, for example, the nodes 1A to 1G transmit the obtained biometric information to the hub 2. In the first embodiment, a description will be given in a case of using a star topology; however, the above configuration may also be used for a tree topology.

Furthermore, the wireless communication system according to the first embodiment, communication is performed among the nodes 1A to 1G and the hub 2 by using the time division multiple access (TDMA). The TDMA is a multiplex system in which a frequency used for the communication are divided by a certain period and shared. Specifically, each of the nodes 1A to 1G communicates with the hub 2 in a fixed period of time that is given by the hub 2. The operation of the communication using the TDMA will be described in detail later.

In a description below, the nodes 1A to 1G are simply described a "node 1" as long as they need not be distinguished.

FIG. 2 is a block diagram illustrating the function of a node according to the first embodiment. The node 1 includes a wireless communication control unit 101, a scheduler 102, a timer control unit 103, a power supply control unit 104, an RSSI calculating unit 105, an RSSI table creating unit 106, a sensor control unit 107, a memory control unit 108, and a storing unit 109. Furthermore, the node 1 also includes an antenna that is connected to the wireless communication control unit 101.

The wireless communication control unit 101 controls the wireless communication with the hub 2. If a power source of the wireless communication control unit 101 is turned on by the power supply control unit 104, which will be described later, and if the wireless communication control unit 101 enters the active state, the wireless communication control unit 101 enters the state in which it can perform the wireless communication. Furthermore, the wireless communication control unit 101 has a clock.

The wireless communication control unit 101 receives a beacon from the hub 2 via the antenna. The beacon is notification information that includes, for example, synchronization information and communication time allocation information and that is transmitted from the hub 2 to each node 1. A beacon number is added to a beacon. The beacon number is information for identifying each beacon. Accordingly, it is possible to specify, using the beacon number, the time at which the beacon is transmitted. The wireless communication control unit 101 acquires a beacon number from a received beacon and outputs the beacon to the scheduler 102. Furthermore, the wireless communication control unit 101 outputs the beacon and the beacon number to the RSSI calculating unit 105.

Furthermore, the wireless communication control unit 101 receives an input of sensing data from the sensor control unit 107. Furthermore, the wireless communication control unit 101 receives, from the timer control unit 103, the notification of the starting and the end of a communication available time slot for a subject node. Then, in accordance with the notification from the timer control unit 103, the wireless communication control unit 101 transmits the sensing data to the hub 2 via the antenna during the communication available time slot for the subject node.

Furthermore, the wireless communication control unit 101 receives an input of an RSSI table from the RSSI table creating unit 106 and then transmits the received RSSI table to the hub 2 via the antenna.

Furthermore, if there is a packet that is a different node transmitted to the hub 2 when a subject node is in the active state, the wireless communication control unit 101 receives the packet via the antenna. The different node mentioned here means a node that is other than the subject node and that is a slave station of the hub 2. For example, a different node with respect to the node 1A illustrated in FIG. 1 corresponds to the nodes 1B to 1G. The node number of the node that transmits the subject packet is added to the subject packet. Then, the wireless communication control unit 101 acquires the node number from the received packet. Furthermore, the wireless communication control unit 101 acquires, from the clock included in the corresponding wireless communication control unit 101, the time at which a packet is received from a different node. Then, the wireless communication control unit 101 outputs, to the RSSI calculating unit 105, the packet and the node number received from the different node, and the time of receipt.

Furthermore, if the power supply control unit 104 turns off a power supply of a subject node and thus the subject node enters the sleep state, the wireless communication control unit 101 does not perform the wireless communication.

The scheduler 102 previously stores therein the time at which a beacon is transmitted. For example, the scheduler 102 stores therein a specific time a day at which a beacon is transmitted. For another example, the node 1 may also in the standby state when the entire system is started, assuming that a beacon is transmitted when the entire system is started. Then, the scheduler 102 outputs, to the timer control unit 103, the time at which the beacon is transmitted.

Furthermore, the scheduler 102 receives, from the wireless communication control unit 101, an input of a beacon transmitted from the hub 2. Then, the scheduler 102 acquires, from the received beacon, synchronization information and communication time allocation information. In a description below, the communication available time allocated by the hub 2 is sometimes referred to as a communication available time slot. Then, the scheduler 102 outputs the synchronization information to the timer control unit 103. Furthermore, the scheduler 102 also previously stores therein the time at which the node 1A can communicate even during the communication available time slot for a different node. For example, the scheduler 102 stores therein data indicating that a subject node is allowed to communicate during a communication available time slot that is received for the first time after a beacon is received and is allowed to communicate even during a communication available time slot for a different node that occurs every 10 communication available time slots for the subject node. At this time, the scheduler 102 stores therein, for example, data indicating that a subject node uses what number of the communication available time slot, indicating that a communication available time slot for a different node occurs after a predetermined time period has elapsed from the communication available time slot for the subject node, and indicating that a communication available time slot for a different node occurs further after a predetermined time period has elapsed from the communication available time slot for the first different node. Furthermore, the scheduler 102 similarly stores therein the communication available time slot for a different node located previous to the subject node 1.

Accordingly, the scheduler 102 can also grasp the schedule for communication available time slots for different nodes. For another example, because a communication available time slot for a different node is recorded in a beacon, the scheduler 102 may also grasp the schedule for a communication available time slot for the different node by referring to the communication available time for the different node recorded in the beacon. Then, the scheduler 102 outputs, to the timer control unit 103, information on the communication available time slot and the time that allows the subject node to communicate during the communication available time slot for the different node.

The timer control unit 103 has a clock. The timer control unit 103 receives, from the scheduler 102, an input of the time at which a beacon is transmitted. Then, by using the clock in the timer control unit 103, the timer control unit 103 instructs the power supply control unit 104 to supply electrical power at the time of transmission of the beacon. Thereafter, if the beacon has been transmitted, the timer control unit 103 instructs the power supply control unit 104 to end the supply of the electrical power.

In the first embodiment, the scheduler 102 stores therein the time at which a beacon is transmitted; however, the configuration is not limited thereto. For example, the timer control unit 103 may also previously stores the time at which a beacon is transmitted.

The timer control unit 103 receives synchronization information from the scheduler 102. Then, by using the synchronization information, the timer control unit 103 synchronizes the communication time stored in the clock included in the timer control unit 103 with that in the hub 2.

Furthermore, the timer control unit 103 receives, from the scheduler 102, an input of information on the communication available time slot for the subject node and the time that allows the subject node to communicate during a communication available time slot for a different node.

Then, by using the clock included in the timer control unit 103, the timer control unit 103 instructs the power supply control unit 104 to start supplying electrical power at the start time of the communication available time slot for the subject node. Thereafter, at the end time of the communication available time slot, the timer control unit 103 instructs the power supply control unit 104 to end the supply of the electrical power. Furthermore, the timer control unit 103 notifies the wireless communication control unit 101 of the start and the end of the communication available time slot for the subject node.

Furthermore, the timer control unit 103 instructs the power supply control unit 104 to start supplying the electrical power when the subject node can communicate during the communication available time slot for a different node. Thereafter, at the end of the communication available time slot for the different node, the timer control unit 103 instructs the power supply control unit 104 to end the supply of the electrical power.

The power supply control unit 104 controls the turning on and off the power supply of the subject node. For example, the power supply control unit 104 controls the turn on/off the electrical power of the wireless communication control unit 101, the RSSI calculating unit 105, the RSSI table creating unit 106, the sensor control unit 107, the memory control unit 108, and the storing unit 109. In the first embodiment, the line for supplying the power supply from the power supply control unit 104 to each unit is omitted in the drawings.

If the power supply control unit 104 receives, from the timer control unit 103, an instruction to start supplying electrical power, the power supply control unit 104 turns on the power supply to start supplying the electrical power to each unit. If the power supply control unit 104 turns on the power supply and if the electrical power is supplied, the node 1 enters the active state.

Furthermore, if the power supply control unit 104 receives, from the timer control unit 103, an instruction to end the supply of the electrical power, the power supply control unit 104 turns off the power supply and stops supplying the electrical power. If the power supply control unit 104 turns off the power supply and stops supplying the electrical power, the node 1 enters the sleep state. Because the node 1 enters the sleep state, the electrical power consumption can be reduced.

The RSSI calculating unit 105 receives a beacon and a beacon number from the wireless communication control unit 101. Then, the RSSI calculating unit 105 calculates, from the received beacon, an RSSI value of a signal received from the hub 2. For example, the RSSI calculating unit 105 acquires, from the amplitude of the received signal, the reception level of the signal and obtains an RSSI value by using the acquired reception level. In the first embodiment, the RSSI of the signal received from the hub 2 is calculated by using a beacon; however, this process may also be omitted.

Then, the RSSI calculating unit 105 outputs, to the memory control unit 108 together with a store instruction that is to be transmitted to the storing unit 109, the calculated RSSI value of the signal transmitted from the hub 2 and the beacon number. In the first embodiment, a beacon number is used to specify the time at which the beacon is received; however, other information may also be used as long as the time of receipt is obtained. For example, it is also possible to use the time at which the wireless communication control unit 101 receives a beacon.

Furthermore, the RSSI calculating unit 105 receives, from the wireless communication control unit 101, an input of a packet transmitted from a different node. Then, the RSSI calculating unit 105 calculates, from the received packet transmitted from the different node, an RSSI value of a signal transmitted from the node. Furthermore, the RSSI calculating unit 105 receives, from the wireless communication control unit 101, an input of the node number of the transmission source of the packet and the time of receipt.

Then, the RSSI calculating unit 105 outputs, to the memory control unit 108 together with the store instruction that is to be transmitted to the storing unit 109, the calculated RSSI value of the signal transmitted from the different node, the node number, and the time information. In the first embodiment, a description has been in a case in which, when an RSSI value is obtained, the RSSI value is calculated by using a single packet; however, the calculation is not limited thereto. For example, an RSSI value may also be obtained by calculating multiple RSSI values from multiple packets and averaging the calculated multiple RSSI values.

The storing unit 109 is a storage device, such as a memory or a hard disk.

The memory control unit 108 controls the writing and the reading of data to the storing unit 109. The memory control unit 108 receives, from the RSSI calculating unit 105, an input of an RSSI value of the signal transmitted from the hub 2 and a beacon number. Then, the memory control unit 108 allows the storing unit 109 to store therein, in an associated manner, RSSI values of signals transmitted from the hub 2 and beacon numbers.

Furthermore, the memory control unit 108 receives, from the RSSI calculating unit 105 together with a store instruction, an RSSI value of a signal transmitted from a different node, a node number, and time information. Then, the memory control unit 108 allows the storing unit 109 to store therein, in an associated manner, the RSSI value of the signal transmitted from the different node, the node number, and the time information.

Furthermore, the memory control unit 108 receives, from the RSSI table creating unit 106, a request for reading the RSSI value. Then, the memory control unit 108 reads the specified RSSI value from the storing unit 109 and outputs it to the RSSI table creating unit 106.

The sensor control unit 107 is attached to, for example, a cow or a pig, and controls a sensor in order to acquire biometric information, such as a body temperature or a pulse. The sensor control unit 107 acquires sensing data that is detected by a sensor at a predetermined time. Then, the sensor control unit 107 outputs the acquired sensing data to the RSSI table creating unit 106.

The RSSI table creating unit 106 previously stores therein the RSSI table in a certain format. FIG. 3 is a schematic diagram illustrating an example of an RSSI table. In the first embodiment, the RSSI table creating unit 106 stores therein the RSSI table in the format illustrated in FIG. 3. FIG. 3 illustrates an example of an RSSI table obtained in a case in which the node number of the node 1 is i. A beacon number is stored as top data 301 in the RSSI table. Furthermore, as data 302 that is subsequent to the data 301, an RSSI value of a signal transmitted from the hub 2 is stored. Furthermore, as data 303 that is subsequent to the data 302, i+1 that is the node number of the node #i+1 and the time of receipt of the packet transmitted from the node #i+1 are stored. Furthermore, as data 304 that is subsequent to the data 303, an RSSI value of a signal transmitted from the node #i+1 is stored. Furthermore, in data 305, i+2 that is a node number of the node number i+2 and the time of receipt of the packet transmitted from the node #i+2 are stored. Furthermore, as data 306 subsequent to the data 305, an RSSI value of a signal transmitted from the node #i+2 is stored. Similarly, the RSSI table stores therein node numbers and RSSI values of the signals transmitted from the node that has corresponding node number are recorded by incrementing the node number, up to the node number n, by one. Specifically, FIG. 3 illustrates an example by using a node #i+1 and a node #i+2; however, in practice, the RSSI table in FIG. 3 has a maximum of node #n. Accordingly, in the first embodiment, the RSSI table creating unit 106 stores therein the RSSI table in the format in which RSSI values of signals transmitted from the node having the node number i+1, which is greater than the subject node number i, to n are recorded. However, in the RSSI table, if there is a node that is not received by a signal at a node #i from among nodes having the node number i+1 to n, the RSSI value of the signal transmitted from that node is not recorded.

The RSSI table creating unit 106 receives an input of the sensing data from the sensor control unit 107. Furthermore, the RSSI table creating unit 106 requests the memory control unit 108 to read, from the storing unit 109, each of the RSSI values, the beacon numbers, the node numbers, and the time of receipt. Then, the RSSI table creating unit 106 acquires each of the RSSI values, the beacon numbers, the node numbers, and the time of receipt that are read by the memory control unit 108. The RSSI table creating unit 106 creates the RSSI table illustrated in FIG. 3 by using the recorded data information on the acquired RSSI values, the beacon numbers, the node numbers, and the time of receipt.

Then, the RSSI table creating unit 106 outputs the created RSSI table and the sensing data to the wireless communication control unit 101.

Figure 4:
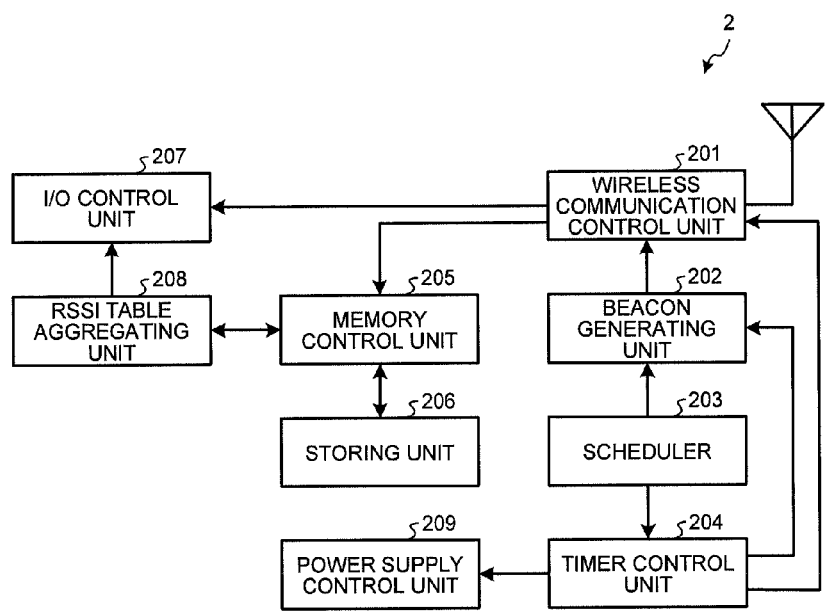
FIG. 4 is a block diagram illustrating the function of a hub according to the first embodiment.

In the following, the configuration of the hub according to the first embodiment will be described with reference to FIG. 4. FIG. 4 is a block diagram illustrating the function of a hub according to the first embodiment. As illustrated in FIG. 4, the hub 2 according to the first embodiment includes a wireless communication control unit 201, a beacon generating unit 202, a scheduler 203, a timer control unit 204, a memory control unit 205, a storing unit 206, an I/O control unit 207, an RSSI table aggregating unit 208, and a power supply control unit 209.

The wireless communication control unit 201 controls the wireless communication performed with the node 1. The wireless communication control unit 201 receives a beacon from the beacon generating unit 202. Then, in response to the instruction received from the timer control unit 204 to transmit a beacon, the wireless communication control unit 201 broadcasts the acquired beacon and transmits it to all of the nodes 1 that are slave stations of the hub 2.

Furthermore, the wireless communication control unit 201 receives sensing data from the node 1 during each of the communication available time slots allocated to each node 1. Furthermore, the wireless communication control unit 201 receives an RSSI table from the node 1 to which the slot is allocated during a communication available time slot that is allocated to each node 1. For example, the wireless communication control unit 201 receives an RSSI table from each node 1 every 10 communication available time slots. Then, the wireless communication control unit 201 outputs the received sensing data to the I/O control unit 207. Furthermore, the wireless communication control unit 201 outputs, to the memory control unit 205, the received RSSI table together with the store instruction indicating that the received RSSI table is stored in the storing unit 206.

The beacon generating unit 202 acquires, from the scheduler 203, for example, the length of a communication available time slot for each node 1, which is the slave station of the hub 2, and a standby time between communication available time slots for each node 1. Furthermore, the beacon generating unit 202 creates synchronization information by using information on an operation clock and the time of the subject node acquired from the timer control unit 204. Furthermore, the beacon generating unit 202 obtains allocation information on a communication available time slot for each node 1 by using the information on the communication available time slot acquired from the scheduler 20. Then, the beacon generating unit 202 creates a beacon containing the synchronization information and the allocation information on the communication available time slot for each node.

The beacon generating unit 202 outputs the created beacon to the wireless communication control unit 201.

The scheduler 203 previously stores therein the transmission time of a beacon that is specified by an operator. Furthermore, the scheduler 203 stores therein the length of a communication available time slot for each node 1, which is the slave station of the hub 2, and a standby time between communication available time slots for each node 1 that are specified by an operator. Furthermore, in the first embodiment, the scheduler 203 stores therein the start time and the end time of the daily operation of the hub 2. For example, the scheduler 203 stores therein the schedule such that the operation of the hub 2 is started at a predetermined time in the morning and ends at a predetermined time in the evening.

The scheduler 203 notifies the timer control unit 204 of the start time of the operation of the hub 2. Then, the scheduler 203 transmits, to the timer control unit 204, the transmission time of a beacon. Furthermore, the scheduler 203 transmits, to the beacon generating unit 202, the length of a communication available time slot for each node 1, which is the slave station of the hub 2, and standby time between communication available time slots for each node 1. Furthermore, the scheduler 203 notifies the timer control unit 204 of the end time of the operation of the hub 2.

The timer control unit 204 receives the start time of the operation from the scheduler 203. Then, the timer control unit 204 instructs the power supply control unit 209 to start supplying electrical power at the start time of the operation. Furthermore, the timer control unit 204 receives the end time of the operation from the scheduler 203. Then, the timer control unit 204 instructs the power supply control unit 209 to stop supplying the electrical power when the operation is to end.

Furthermore, the timer control unit 204 acquires an operation clock from a clock generator. Then, the timer control unit 204 outputs the operation clock and the time to the beacon generating unit 202.

Furthermore, the timer control unit 204 instructs the wireless communication control unit 201 to transmit a beacon when the beacon is to be transmitted.

The power supply control unit 209 receives, from the timer control unit 204, an instruction to start supplying electrical power to each unit. Then, the power supply control unit 209 turns on the power supply and starts supplying the electrical power to each unit. Furthermore, the power supply control unit 209 receives, from the timer control unit 204, an instruction to stop supplying the electrical power to each unit. Then, the power supply control unit 209 turns off the power supply and stops supplying the electrical power to each unit.

The storing unit 206 is a storage device, such as a memory or a hard disk.

The memory control unit 205 receives, from the wireless communication control unit 201, an input of an RSSI table received from each node 1. Then, the memory control unit 205 sequentially stores, in the storing unit 206, the RSSI table received from each node.

The RSSI table aggregating unit 208 waits until RSSI tables received from all of the nodes 1, which are the slave stations of the hub 2, are stored in the storing unit 206. By referring to the time of receipt associated with each RSSI recorded in each RSSI table, the RSSI table aggregating unit 208 can extract, from each RSSI table created in each node 1, RSSI values of the time that are close each other. Then, if all of the RSSI tables received from all of the nodes 1, which are the slave stations of the hub 2, have been stored, the RSSI table aggregating unit 208 acquires the RSSI tables from the storing unit 206 via the memory control unit 205. Then, the RSSI table aggregating unit 208 creates an RSSI matrix.

In the following, creating an RSSI matrix performed by the RSSI table aggregating unit 208 will be described in detail. In a description below, an RSSI value of a signal that is transmitted from the node #i (i=1, 2, . . . , and n) to the node #j (j=1, 2, . . . , and n) is referred to as an Sij (i#j). The RSSI matrix is a matrix in which Sij represents a value in the $i^{th}$ row and $j^{th}$ column and Sii=0. From the RSSI matrix described above, the relative position between the nodes 1 can be estimated by using the positioning calculation algorithm.

Figure 5:
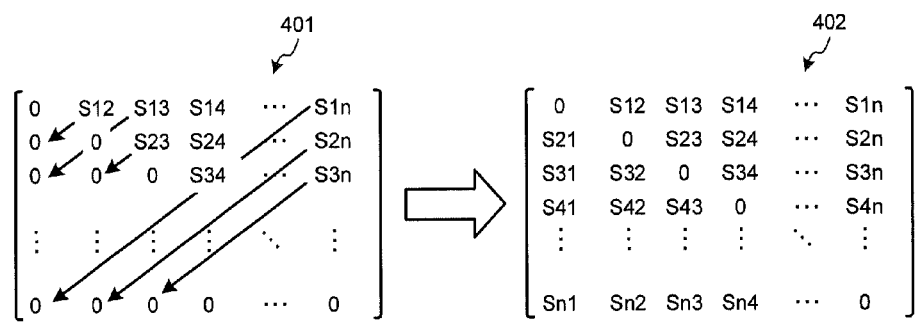
FIG. 5 is a schematic diagram illustrating the creation of an RSSI matrix according to the first embodiment.

An RSSI value of Sij (i<j) is stored in the RSSI table that is received from the node #i stored in the storing unit 206. Specifically, if Sij is contained in an RSSI table that is stored in the storing unit 206, Sji is not present in any RSSI table. Accordingly, a matrix 401 in FIG. 5 illustrates a matrix by arraying a value of Sij that is present and by representing a value of Sij that is not present as zero. FIG. 5 is a schematic diagram illustrating the creation of an RSSI matrix according to the first embodiment. The RSSI table aggregating unit 208 assumes that Sij is Sji by using the duality of a radio wave. Specifically, as illustrated by the arrows in the matrix 401 in FIG. 5, a value of the starting point of the arrow is inserted as a value of the end point. Accordingly, the RSSI table aggregating unit 208 creates an RSSI matrix 402.

The RSSI table aggregating unit 208 outputs the created RSSI matrix to the I/O control unit 207.

The I/O control unit 207 controls an input/output of data from/to an external unit. The I/O control unit 207 receives an input of the sensing data from the wireless communication control unit 201. Then, the I/O control unit 207 outputs the received sensing data to an upper level server (not illustrated).

Furthermore, the I/O control unit 207 receives an input of an RSSI matrix from the RSSI table aggregating unit 208. Then, the I/O control unit 207 outputs the received RSSI matrix to the upper level server.

The upper level server collects the sensing data and manages the data. Furthermore, the upper level server acquires an RSSI matrix that is output from the I/O control unit 207. Then, the upper level server estimates the relative position between the nodes 1 by using positioning calculation algorithm with respect to the acquired RSSI matrix. In the first embodiment, it is assumed that the master station aggregates the RSSI values, creates an RSSI matrix, and transfers the created RSSI matrix. However, the master station may also have the function of estimating the relative position performed by the upper level server.

Figure 6:
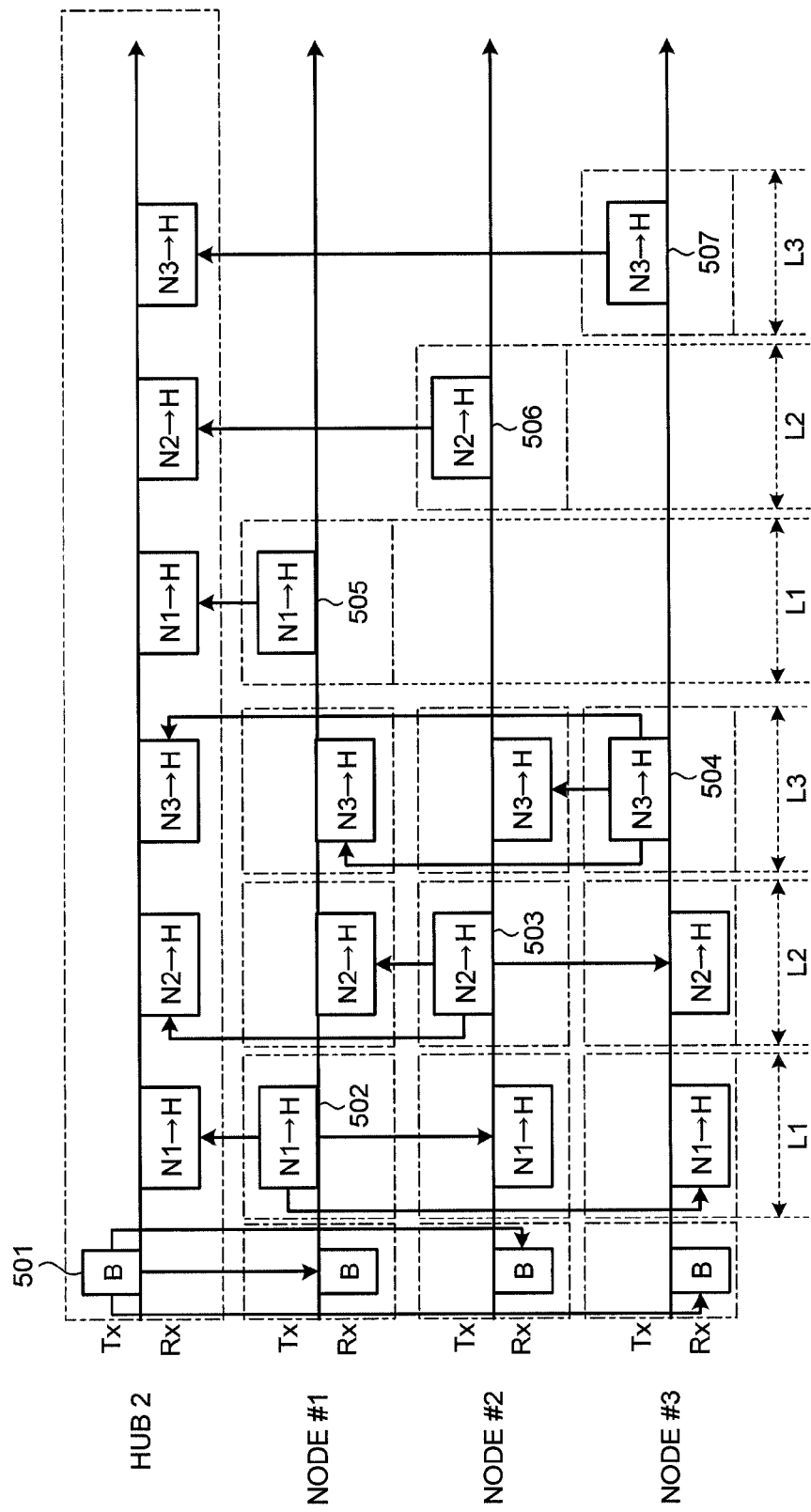
FIG. 6 is a schematic diagram illustrating the transmission and the reception of a signal in the wireless communication system according to the first embodiment.

In the following, the transmission and the reception of a signal performed in the wireless communication system according to the first embodiment will be described with reference to FIG. 6. FIG. 6 is a schematic diagram illustrating the transmission and the reception of a signal in the wireless communication system according to the first embodiment. In FIG. 6, the arrows illustrated from the left to the right in the plane of the drawing indicate the time elapsed. Furthermore, each rectangle arranged on an arrow represents a signal. Furthermore, an arrow connecting each rectangle represents the transmission and the reception of a signal, the starting end of an arrow represents a transmitted signal, and the leading end of the arrow represents a received signal. Furthermore, a device name illustrated on the starting end side of the arrow, which represents the time elapsed, represents a device that transmits and receives the signal represented by the arrow. For example, the transmission and the reception of the signal represented by an arrow, which represents the time elapsed, illustrated on the top line in the plane of FIG. 6 is performed by the hub 2. Furthermore, the symbol Tx illustrated on the upper side of the arrow, which represents the time elapsed, in the plane of the drawing represents the transmission of a signal, whereas the symbol Rx illustrated on the lower side of the arrow, which represents the time elapsed, in the plane of the drawing represents the reception of a signal. Furthermore, in the region surrounded by the dashed line in FIG. 6, a device illustrated in that region is in the active state. In contrast, in the region that is not surrounded by the dashed line, a device illustrated in that region is in the sleep state. In the following, a wireless communication system that has the hub 2 and the nodes #1 to #3 will be described as an example.

As illustrated in FIG. 6, in the first embodiment, the hub 2 is always in the active state. A signal 501 represents a beacon. The nodes #1 to #3 are in the active state when a beacon is transmitted. Then, the hub 2 broadcasts the beacon. By doing so, the nodes #1 to #3 receive the beacon transmitted by the hub 2. Then, the nodes #1 to #3 acquire, from the received beacon, a communication available time slot allocated to each of the nodes #1 to #3. A communication available time slot represented by L1 is allocated to the node #1. Similarly, a communication available time slot represented by L2 is allocated to the node #2. Similarly, a communication available time slot represented by L3 is allocated to the node #3.

All of the nodes #1 to #3 enter the active state at the timing of the communication available time slot L1 that is allocated to the node #1 and that is the first communication available time slot after the beacon is received. Then, during the time period of L1, the node #1 transmits a signal 502 containing the sensing data to the hub 2. At this time, the nodes #2 and #3 acquire the signal 502 that is transmitted by the node #1 to the hub 2.

Similarly, all of the nodes #1 to #3 enter the active state at the timing of the communication available time slot L2 that is allocated to the node #2 and that is the first communication available time slot after the beacon is received. Then, during the time period of L2, the node #2 transmits a signal 503 containing the sensing data to the hub 2. At this time, the nodes #1 and #3 acquire the signal 503 that is transmitted by the node #2 to the hub 2.

Similarly, all of the nodes #1 to #3 enter the active state at the timing of the communication available time slot L3 that is allocated to the node #3 and that is the first communication available time slot after the beacon is received. Then, during the time period L3, the node #3 transmits a signal 504 containing the sensing data to the hub 2. At this time, the nodes #1 and #2 acquire the signal 504 that is transmitted by the node #3 to the hub 2.

Because an RSSI is not acquired at the timing of the subsequent communication available time slot L1 allocated to the node #1, only the node #1 enters the active state. Then, during the time period of L1, the node #1 transmits a signal 505 containing the sensing data to the hub 2. In such a case, because the nodes #2 and #3 are not in the active state, they do not acquire the signal 505.

Similarly, because an RSSI is not acquired at the timing of the subsequent communication available time slot L2 allocated to the node #2, only the node #2 enters the active state. Then, during the time period of L2, the node #2 transmits a signal 506 containing the sensing data to the hub 2. In such a case, because the nodes #1 and #3 are not in the active state, they do not acquire the signal 506.

Similarly, because an RSSI is not acquired at the timing of the subsequent communication available time slot L3 allocated to the node #3, only the node #3 enters the active state. Then, during the time period of L3, the node #3 transmits a signal 507 containing the sensing data to the hub 2. In such a case, because the nodes #1 and #2 are not in the active state, they do not acquire the signal 507.

Figure 7:
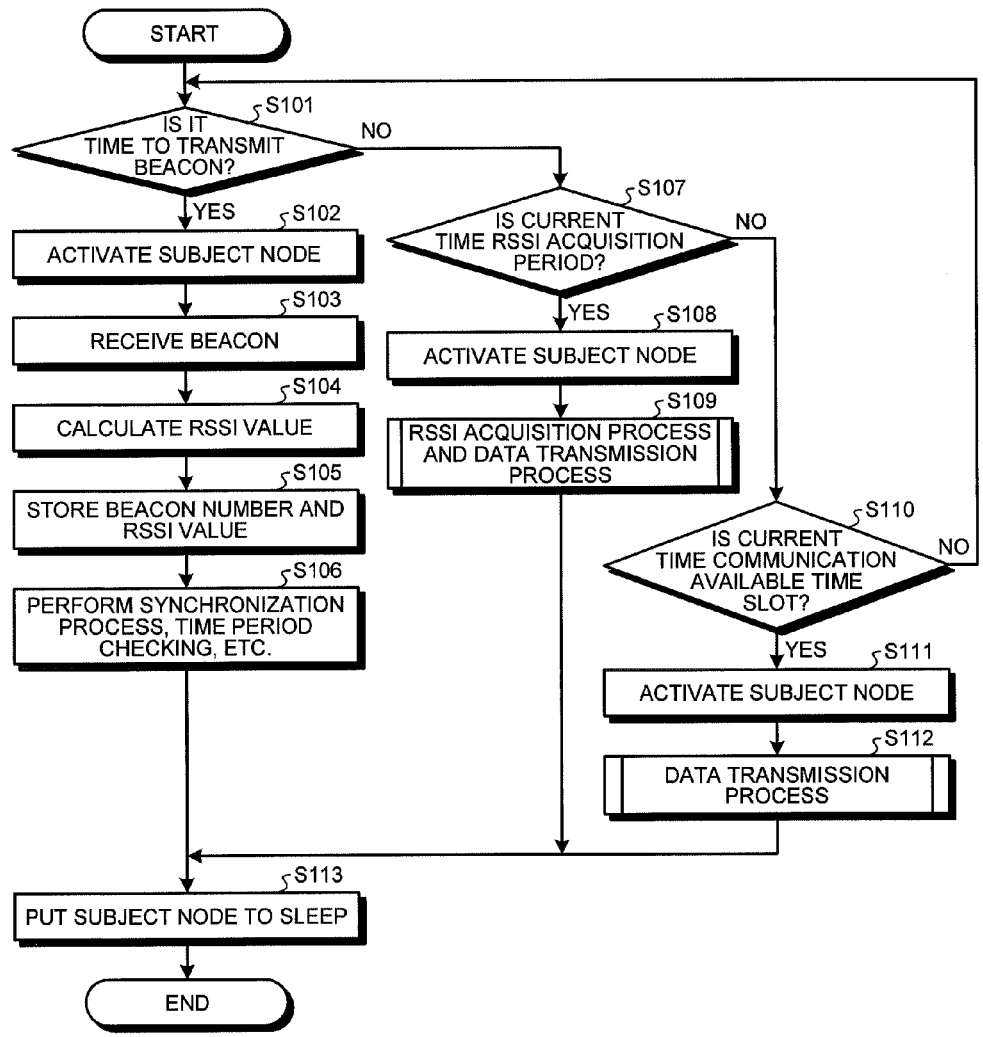
FIG. 7 is a flowchart illustrating the flow of a communication process performed by the wireless communication system according to the first embodiment.
Figure 8:
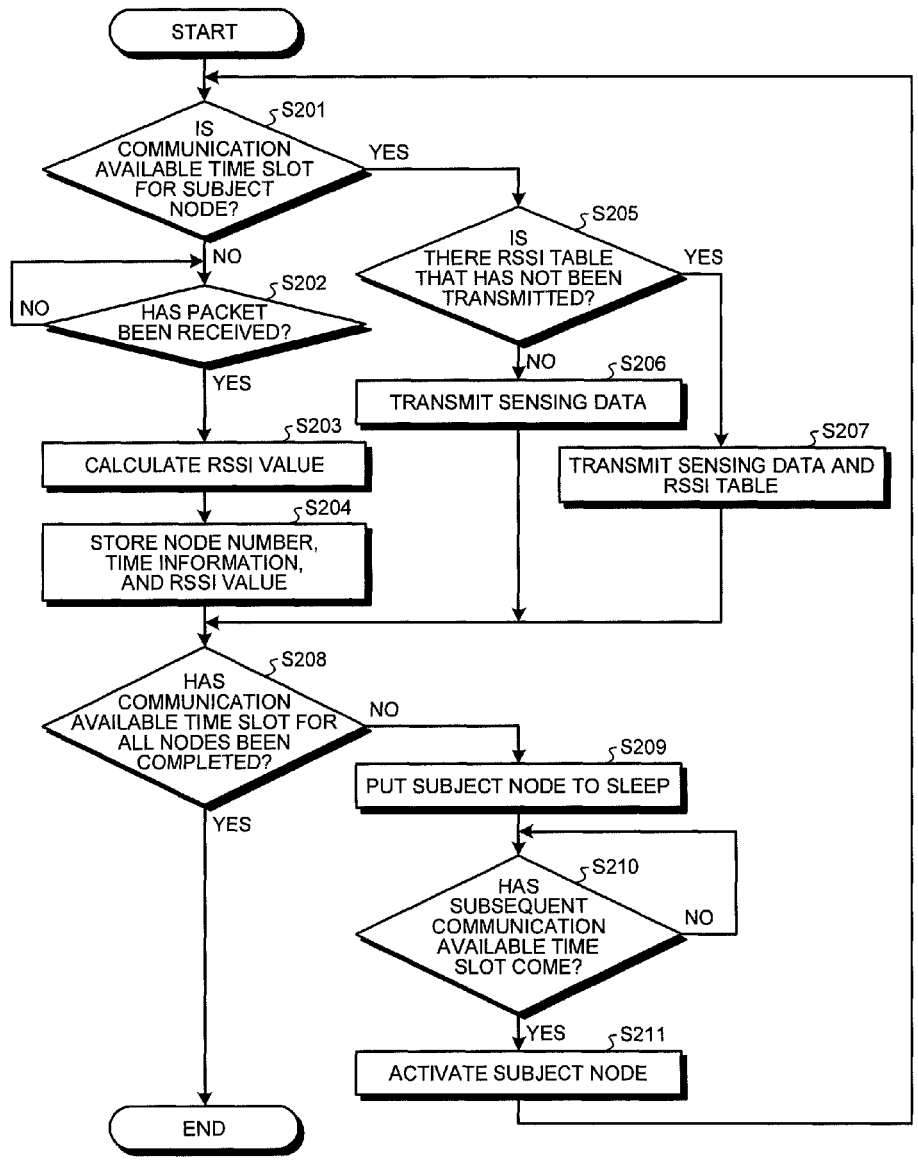
FIG. 8 is a flowchart illustrating the flow of an RSSI acquisition process and a data transmission process.
Figure 9:
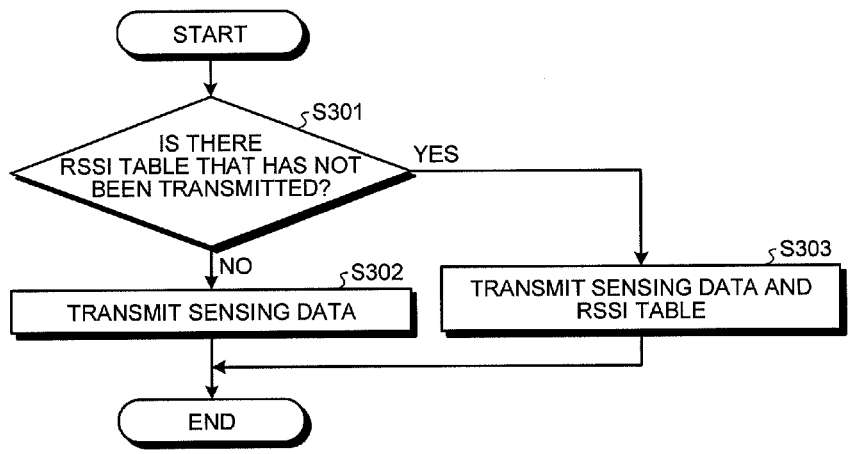
FIG. 9 is a flowchart illustrating the flow of a data transmission process.

In the following, the flow of a communication process performed by the wireless communication system according to the first embodiment will be described with reference to FIGS. 7, 8, and 9. FIG. 7 is a flowchart illustrating the flow of a communication process performed by the wireless communication system according to the first embodiment. FIG. 8 is a flowchart illustrating the flow of an RSSI acquisition process and a data transmission process. FIG. 9 is a flowchart illustrating the flow of a data transmission process. First, the flow of the overall communication process will be described with reference to FIG. 7. FIG. 7 illustrates the flow of a single communication process starting from the sleep state of the node 1. In practice, the flow of the communication process illustrated in FIG. 7 are repeated until the power supply is turned off.

The timer control unit 103 determines if it is time to transmit a beacon notified from the scheduler 102 (Step S101).

If it is time to transmit the beacon (Yes at Step S101), the timer control unit 103 instructs the power supply control unit 104 to supply electrical power. In response to the instruction to start supplying the electrical power, the power supply control unit 104 turns on the power supply to supply the electrical power to each unit, thereby activating a subject node (Step S102).

Then, the wireless communication control unit 101 receives the beacon transmitted from the hub 2 (Step S103).

Then, the RSSI calculating unit 105 receives, from the wireless communication control unit 101, an input of the beacon and the beacon number. Thereafter, the RSSI calculating unit 105 calculates an RSSI value of a signal transmitted from the hub 2 by using the received beacon (Step S104).

Then, the memory control unit 108 receives, from the RSSI calculating unit 105, an input of the beacon number and the RSSI of the signal transmitted from the hub 2. Then, the memory control unit 108 stores, in an associated manner in the storing unit 109, the beacon number and the RSSI value of the signal transmitted from the hub 2 (Step S105).

Furthermore, the scheduler 102 receives an input of the beacon from the wireless communication control unit 101. Then, the scheduler 102 acquires, from the beacon, synchronization information and information on a communication available time slot. The timer control unit 103 receives, from the scheduler 102, an input of the synchronization information and the information on the communication available time slot. Then, the timer control unit 103 performs a synchronization process, a time period checking of the communication available time slot, and the like (Step S106).

After the time period for which the beacon is transmitted, the power supply control unit 104 turns off the power supply to stop supplying the electrical power to each unit and put the subject node to sleep (Step S113).

In contrast, if it is not time to transmit a beacon (No at Step S101), the timer control unit 103 determines whether the current state is the RSSI acquisition time period notified from the scheduler 102 (Step S107). The RSSI time period means the timing at which an RSSI of a signal transmitted from the different node is acquired. For example, in the first embodiment, this time period comes every 10 communication available time slots.

If the current state is the RSSI acquisition time period (Yes at Step S107), the timer control unit 103 instructs the power supply control unit 104 to supply electrical power. In response to the instruction to turn on the power supply, the power supply control unit 104 turns on the power supply to supply electrical power to each unit, thus activating the subject node (Step S108).

Then, the node 1 performs the RSSI acquisition process and the data transmission process (Step S109). The RSSI acquisition process and the data transmission process performed at Step S109 will be described in detail later with reference to FIG. 8.

Then, the power supply control unit 104 turns off the power supply to stop supplying the electrical power to each unit and puts the subject node to sleep (Step S113).

In contrast, if the current state is not the RSSI acquisition time period (No at Step S107), the timer control unit 103 determines if it is the time of the communication available time slot for the subject node (Step S110). If the timer control unit 103 determines that it is not the time of the communication available time slot for the subject node (No at Step S110), the timer control unit 103 returns to Step S101.

In contrast, if it is the time of the communication available time slot for the subject node (Yes at Step S110), the timer control unit 103 instructs the power supply control unit 104 to supply the electrical power. In response to the instruction to turn on the power supply, the power supply control unit 104 turns on the power supply to supply the electrical power to each unit, thereby activating the subject node (Step S111).

Then, the node 1 performs the data transmission process (Step S112). The data transmission process performed at Step S112 will be described in detail later with reference to FIG. 9.

Then, the power supply control unit 104 turns off the power source to stop supplying the electrical power to each unit and puts the subject node to sleep (Step S113).

In the following, the RSSI acquisition process and the data transmission process performed at Step S109 illustrated in FIG. 7 will be described with reference to FIG. 8.

If the subject node enters the active state at the RSSI acquisition time, on the basis of the notification from the timer control unit 103, the wireless communication control unit 101 determines whether a communication available time slot is for the subject node (Step S201).

If the communication available time slot is not for the subject node (No at Step S201), the wireless communication control unit 101 determines whether a different node receives a packet transmitted to the hub 2 (Step S202). If the different node does not receive the packet (No at Step S202), the wireless communication control unit 101 waits until the packet is received.

In contrast, if the packet is received (Yes at Step S202), the RSSI calculating unit 105 calculates an RSSI value by using the packet received by the wireless communication control unit 101 (Step S203).

The memory control unit 108 receives a node number, time information, and information on the RSSI value from the RSSI calculating unit 105. Then, the memory control unit 108 stores, in the storing unit 109 in an associated manner, the node number, the time information, and the information on the RSSI value (Step S204).

In contrast, if the communication available time slot is for the subject node (Yes at Step S201), the wireless communication control unit 101 determines whether an RSSI table that has not been transmitted is present (Step S205).

If an RSSI table that has not been transmitted is not present (No at Step S205), the wireless communication control unit 101 transmits, to the hub 2, the sensing data received from the sensor control unit 107 (Step S206).

In contrast, if an RSSI table that has not been transmitted is present (Yes at Step S205), the wireless communication control unit 101 transmits, to the hub 2 together with the sensing data received from the sensor control unit 107, the RSSI table created by the RSSI table creating unit 106 (Step S207).

Then, the wireless communication control unit 101 determines whether the communication available time slots for all of the node, which are the slave stations of the hub 2, including the subject node have been completed (Step S208).

If the communication available time slots for all of the nodes have not been completed (No at Step S208) and if it is the time of ending of the communication available time slot for the subject node or for the different node, the timer control unit 103 instructs the power supply control unit 104 to stop supplying the electrical power. In response to the instruction from the timer control unit 103, the power supply control unit 104 turns off the power source to stop supplying the electrical power and puts the subject node to sleep (Step S209).

Then, the timer control unit 103 determines if it is the time of a subsequent communication available time slot from among the communication available time slots for all of the slave stations of the hub 2 (Step S210).

If it is not the time of the subsequent communication available time slot (No at Step S210), the timer control unit 103 waits until the subsequent communication available time slot comes.

In contrast, if it is the time of the subsequent communication available time slot (Yes at Step S210), the timer control unit 103 instructs the power supply control unit 104 to supply electrical power. In response to the instruction to turn on the power supply, the power supply control unit 104 turns on the power source and supplies electrical power to each unit to activate the subject node (Step S211), and then returns to Step S201.

Then, if the process has been completed for the communication available time slots for all node (Yes at Step S208), the wireless communication control unit 101 ends the RSSI acquisition process and the data transmission process.

In the first embodiment, data is not transmitted from the hub 2 to the node #i; however, in practice, there may be a case in which data is transmitted from the hub 2 to the node #i. In such a case, for example, after performing the process at Step S204 illustrated in FIG. 8, an additional process is performed, where it is determined whether the node #i is transmitted to a subject node and whether the payload is checked.

In the following, the data transmission process performed at Step S112 illustrated in FIG. 7 will be described with reference to FIG. 9.

The wireless communication control unit 101 determines whether an RSSI table that has not been transmitted is present (Step S301).

If an RSSI table that has not been transmitted is not present (No at Step S301), the wireless communication control unit 101 transmits the sensing data received from the sensor control unit 107 to the hub 2 (Step S302).

In contrast, if an RSSI table that has not been transmitted is present (Yes at Step S301), the wireless communication control unit 101 transmits, to the hub 2 together with the sensing data received from the sensor control unit 107, the RSSI table created by the RSSI table creating unit 106 (Step S303). Then, the wireless communication control unit 101 ends the data transmission process.

In the first embodiment, a description has been given using an RSSI as propagation information. However, other information may also be used as long as information that represents the state of other propagation paths. For example, it may also be possible to use a propagation delay corresponding to the distance between nodes or to use the Doppler shift corresponding to the relative velocity between nodes. For example, if the propagation delay or the Doppler shift is used as the propagation information, by using the time at which a node receives a packet that is transmitted to the hub by a different node, it is possible to obtain the propagation delay or the Doppler shift between the node and the different node.

As described above, the wireless communication system according to the first embodiment allows a different node to be capable of communicating at a certain time during a communication available time slot for a certain node and acquires a packet transmitted to the hub by the certain node. In other words, the different node intercepts a packet that is actually to be transmitted to the hub. Then, by using the intercepted packet, the different node that intercepts the packet obtains an RSSI, which is propagation information on a signal transmitted from a node corresponding to the transmission source of the packet, and notifies the hub of the obtained information on the RSSI. Then, by aggregating information on RSSIs transmitted from each of the nodes, the hub creates an RSSI matrix from which the relative position of each node can be obtained. In the first embodiment, the wireless communication system according to the first embodiment has a tree or star topology and performs TDMA communication.

Specifically, because a tree or star topology is used, propagation information on each node can be acquired while reducing the electrical power consumption. Furthermore, by creating, for example, an RSSI matrix from propagation information on each node, the relative position of each node can be obtained.

Furthermore, in the first embodiment, because only the RSSI of a signal transmitted from a node having a node number greater than that of the subject node is transmitted to the hub, it is possible to reduce, in terms of the entire network, an amount of data transmission from a node to the hub, thus reducing the load of aggregation of RSSI data applied on the network. In particular, in the first embodiment, the amount of data transmission can be reduced to about half when compared with a case in which RSSIs of signals from all of the nodes are transmitted to the hub.

In the first embodiment, a description has been given of a case in which only the RSSI of a signal from a node having a node number greater than that of the subject node is transmitted to the hub. However, even if RSSIs of signals from all of the nodes are transmitted to the hub, an advantage is provided in that propagation information on each node can be acquired while reducing the electrical power consumption by using a tree or star topology.

Modification 1

Furthermore, in the first embodiment, to reduce an amount of data transmission with respect to the hub, the RSSI table creating unit 106 records, in an RSSI table, only the information on an RSSI of a signal transmitted from a node having a node number greater than that of the subject node. However, another method of selecting information on an RSSI to be transmitted to the hub 2 may also be used as long as all of the RSSIs of the nodes with respect to the hub can be eventually acquired. Accordingly, in the following, another method of selecting information on an RSSI transmitted to the hub 2 will be described.

For example, the RSSI table creating unit 106 extracts an RSSI value of a signal transmitted from a node having a node number that is greater than that of the subject node and that is an even number and extracts an RSI value of a signal transmitted from a node having a node number that is less than that of the subject node and that is an odd number. Then, the RSSI table creating unit 106 records the extracted RSSI value in an RSSI table.

In contrast, the RSSI table creating unit 106 extracts an RSSI value of a signal transmitted from a node having a node number that is greater than that of the subject node and that is an odd number and extracts an RSSI value of a signal transmitted from a node having a node number that is less than that of the subject node and that is an even number. Then, the RSSI table creating unit 106 records the extracted RSSI value in an RSSI table.

Figure 10:
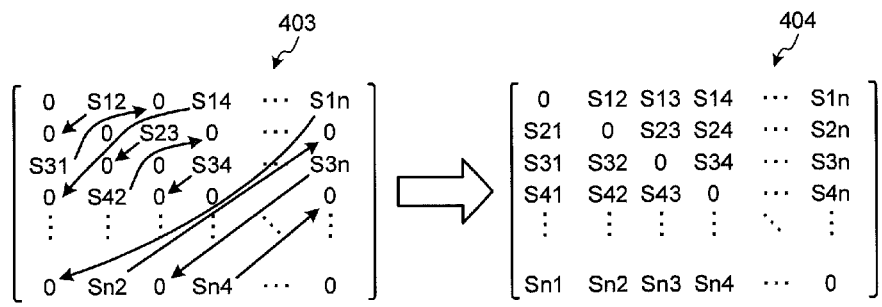
FIG. 10 is a schematic diagram illustrating the creation of an RSSI matrix in modification 1 according to the first embodiment.

For example, when using the selection method described above in a first case, the RSSI table aggregating unit 208 in the hub 2 can create a matrix 403 illustrated in FIG. 10 from an RSSI table received from each node. FIG. 10 is a schematic diagram illustrating the creation of an RSSI matrix in modification 1 according to the first embodiment.

Then, the RSSI table aggregating unit 208 uses the duality of a radio wave to define Sij=Sji. Specifically, as illustrated by the arrow in the matrix 403, a value of the starting point of the arrow is inserted as a value of the end point. Accordingly, the RSSI table aggregating unit 208 can create an RSSI matrix 404 that covers RSSIs of all of the nodes.

Modification 2

Furthermore, it may also be possible to select an RSSI transmitted to the hub by using a method described below. The RSSI table creating unit 106 acquires, from the wireless communication control unit 101, a packet transmitted from a different node. Then, the RSSI table creating unit 106 checks the content of the acquired packet and determines whether the packet includes an RSSI table and whether an RSSI value of a signal transmitted from the subject node is recorded in the RSSI table. If the RSSI value of the signal from the subject node is recorded, the RSSI table creating unit 106 does not record, in the RSSI table, the RSSI value acquired from the packet from the node that transmits the packet.

With this method, if an RSSI of a signal transmitted from a certain node is not transmitted to the hub 2, it is guaranteed that an RSSI of a signal transmitted from the subject node is transmitted to the hub 2 by the certain node. Accordingly, by using the duality of a radio wave to define Sij=Sji, in a similar manner as with the other cases, the RSSI table aggregating unit 208 can create an RSSI matrix that covers RSSIs of all of the nodes.

[b] Second Embodiment

In the following, a wireless communication system according to a second embodiment will be described. The wireless communication system according to the second embodiment differs from the first embodiment in that carrier sense multiple access (CSMA) is used as a communication method. Accordingly, in the following, a description will be mainly given of the operation of each node at the time of RSSI acquisition and the operation of each node at the other time slots. The nodes according to the second embodiment are also represented by the block diagram illustrated in FIG. 1. Furthermore, the hub according to the second embodiment is also represented by the block diagram illustrated in FIG. 4. In the second embodiment, units included in the node and the hub having the same reference numerals as those in the first embodiment have the same function as that described in the first embodiment unless otherwise noted.

The scheduler 102 in the node 1 according to the second embodiment stores therein the time at which a beacon is transmitted. Furthermore, the scheduler 102 acquires a CSMA period from a beacon that is received by the wireless communication control unit 101. Then, the scheduler 102 notifies the timer control unit 103 of the CSMA period. Furthermore, the scheduler 102 according to the second embodiment previously stores therein, from among repeated CSMA periods, the repetition cycle of the time period for which a subject node is allowed to be in the active state in the CSMA period. This repetition cycle corresponds to the RSSI acquisition time. For example, the scheduler 102 stores therein the RSSI acquisition period occurring every 10 CSMA periods.

If electrical power is supplied to each unit by the power supply control unit 104 and if the subject node enters the active state, the wireless communication control unit 101 determines whether a notification of an RSSI acquisition period is received from the timer control unit 103.

If the notification of the RSSI acquisition period has not been received, the state is a normal CSMA period. Accordingly, the wireless communication control unit 101 performs carrier sense and determines whether a packet is transmitted from a different node. If a packet is transmitted from the different node, the wireless communication control unit 101 notifies the timer control unit 103 that communication is not to be performed. If a packet is not transmitted from a different node, the wireless communication control unit 101 transmits sensing data. After the completion of the transmission of the sensing data, the wireless communication control unit 101 notifies the timer control unit 103 of the completion of the communication.

In contrast, if the notification of the RSSI acquisition period is received, the wireless communication control unit 101 performs the carrier sense. If a packet is transmitted from a different node, the wireless communication control unit 101 receives the packet. If a packet is not transmitted from a different node, the wireless communication control unit 101 transmits the sensing data. Then, after transmitting the sensing data, the wireless communication control unit 101 receives a packet from the different node during the CSMA period.

The timer control unit 103 acquires, from the scheduler 102, the time at which a beacon is transmitted. Then, if it is time to transmit a beacon, the timer control unit 103 instructs the power supply control unit to supply electrical power to each unit.

Furthermore, the timer control unit 103 receives, from the scheduler 102, a notification of a CSMA period or of an RSSI acquisition period together with the CSMA period.

If the timer control unit 103 receives only the CSMA period, the timer control unit 103 instructs the power supply control unit 104 to stop supplying the electrical power to each unit, randomly waits in the CSMA period, and instructs the power supply control unit 104 to supply the electrical power. If the timer control unit 103 receives, from the wireless communication control unit 101, a notification that communication is not to be performed, the timer control unit 103 instructs the power supply control unit 104 to stop supplying the electrical power to each unit, randomly again waits in the CSMA period, and instructs the power supply control unit 104 to supply the electrical power to each unit. If the wireless communication control unit 101 receives a notification of the completion of the communication, the timer control unit 103 instructs the power supply control unit 104 to stop supplying the electrical power to each unit and waits until a subsequent CSMA period comes.

In contrast, if the timer control unit 103 receives the RSSI acquisition period together with the CSMA period, the timer control unit 103 allows the subject node to be active in the CSMA period and notifies the wireless communication control unit 101 of the RSSI acquisition period. Then, when the CSMA period ends, the timer control unit 103 instructs the power supply control unit 104 to stop supplying the electrical power to each unit.

In the following, the hub 2 will be described.

The scheduler 203 previously stores therein the CSMA period specified by an operator and the repetition cycle of the CSMA period. Furthermore, the scheduler 203 previously stores therein the time at which a beacon is transmitted.

Then, the scheduler 203 outputs, to the beacon generating unit 202, the CSMA period and the repetition cycle of the CSMA period. Furthermore, the scheduler 203 outputs, to the timer control unit 204, the time at which the beacon is transmitted, the CSMA period, and the repetition cycle of the CSMA period.

Furthermore, the timer control unit 204 acquires an operation clock from the clock generator. Then, the timer control unit 204 outputs the operation clock and the time to the beacon generating unit 202.

Furthermore, the timer control unit 204 receives, from the scheduler 203, the time at which the beacon is transmitted, the CSMA period, and the repetition cycle of the CSMA period. Then, if it is the time to transmit a beacon, the timer control unit 204 instructs the wireless communication control unit 201 to transmit the beacon. Furthermore, if it is the time to transmit a beacon, the timer control unit 204 instructs the power supply control unit 209 to start supplying the electrical power to each unit. Furthermore, when the CSMA period ends, the timer control unit 204 instructs the power supply control unit 209 to stop supplying the electrical power to each unit.

The power supply control unit 209 receives, from the timer control unit 204, an instruction to start supplying the electrical power to each unit. Then, the power supply control unit 209 turns on the power supply and starts supplying electrical power to each unit. Furthermore, the power supply control unit 209 receives, from the timer control unit 204, an instruction to stop supplying the electrical power to each unit. Then, the power supply control unit 209 turns off the power supply and stops supplying the electrical power to each unit.

The RSSI table aggregating unit 208 refers to a beacon number recorded in the RSSI table. Then, the RSSI table aggregating unit 208 acquires an RSSI value having the same beacon number recorded in the RSSI table. By using RSSI tables having the same beacon number, the RSSI table aggregating unit 208 can acquire RSSI values in the same beacon cycle. However, another method may also be used. For example, similarly to the first embodiment, by referring to the reception time of each RSSI, the RSSI table aggregating unit 208 may also extract, from an RSSI table created in each node 1, RSSI values having the time close to each other.

Figure 11:
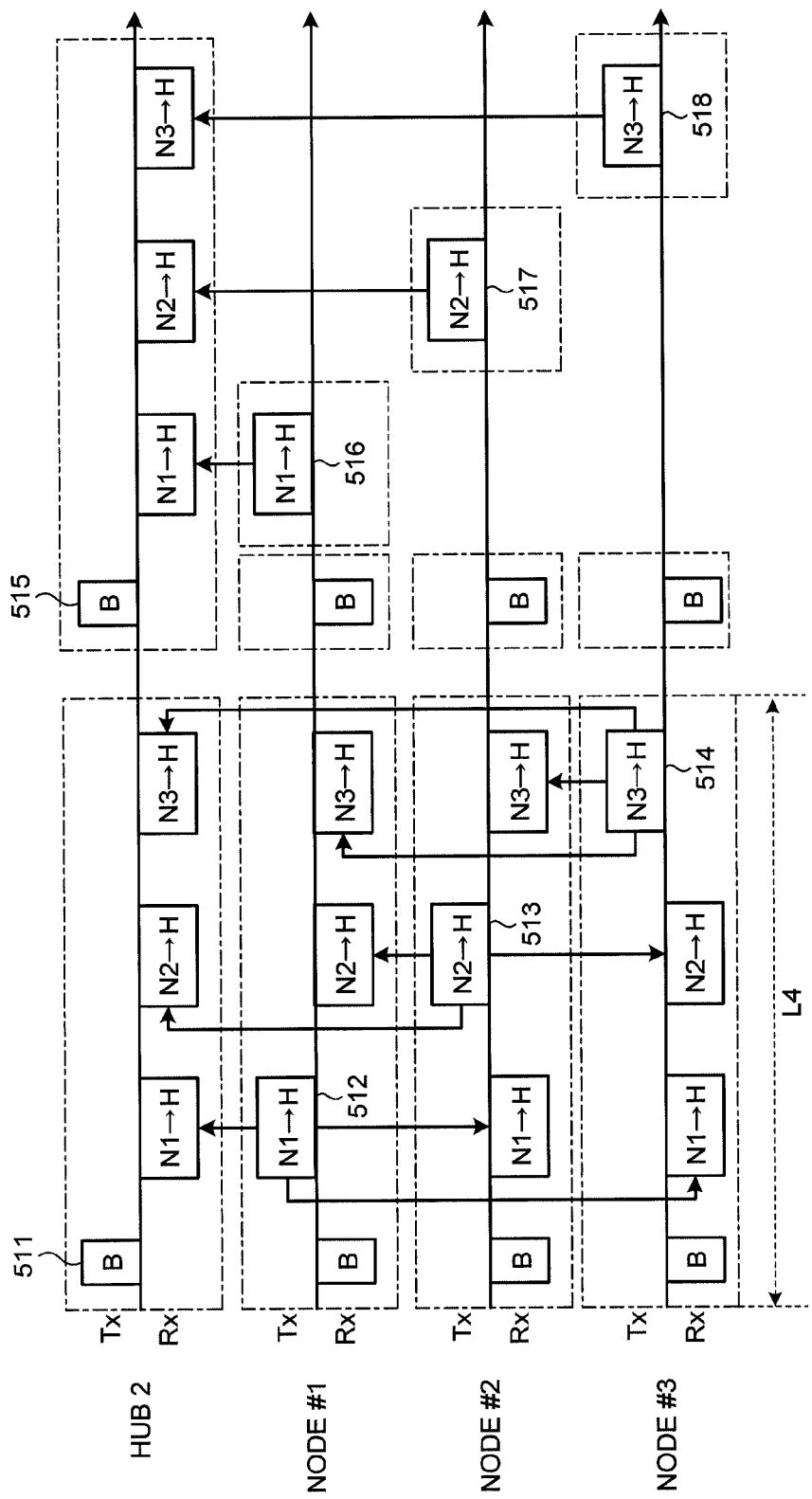
FIG. 11 is a schematic diagram illustrating the transmission and the reception of a signal in a wireless communication system according to a second embodiment.

In the following, the transmission and the reception of a signal performed by the wireless communication system according to the second embodiment will be described with reference to FIG. 11. FIG. 11 is a schematic diagram illustrating the transmission and the reception of a signal in a wireless communication system according to a second embodiment. Arrows, rectangles, and device names illustrated in FIG. 11 are the same as those illustrated in FIG. 6. In the following, a description will be given of a case of a wireless communication system that includes the hub 2 and the nodes #1 to #3. Furthermore, a description will be given of a case in which a first CSMA period is an RSSI period and the subsequent CSMA period is a normal CSMA period.

As illustrated in FIG. 11, in the second embodiment, the hub 2 is active during the time period L4, i.e., the CSMA period, that starts when a beacon is transmitted. Accordingly, in the second embodiment, the hub 2 is in the sleep state during the time period between the end of the CSMA period and a subsequent transmission time of a beacon. The nodes #1 to #3 enters the active state when the beacon, which is a signal 511, is transmitted. Then, the hub 2 broadcasts the beacon. In contrast, each of the nodes #1 to #3 receives the beacon transmitted by the hub 2. Then, each of the nodes #1 to #3 acquires the CSMA period from the received beacon.

Because the nodes #1 to #3 are during the RSSI acquisition period, the nodes #1 to #3 are active during the time period L4 illustrated in FIG. 11, i.e., during the time period between the reception of the beacon and the end of the CSAM period. In this case, first, the node #1 transmits a signal 512 containing the sensing data to the hub 2. At this time, the nodes #2 and #3 acquire the signal 512 that is transmitted, by the node #1, to the hub 2.

Subsequently, the node #2 transmits a signal 513 containing the sensing data to the hub 2. At this time, the nodes #1 and #3 acquire the signal 513 that is transmitted, by the node #2, to the hub 2.

Lastly, the node #3 transmits a signal 514 containing the sensing data to the hub 2. At this time, the nodes #1 and #2 acquire the signal 514 that is transmitted, by the node #3, to the hub 2.

Thereafter, if the CSMA period ends, the hub 2 and all of the nodes #1 to #3 become in the sleep state.

The hub 2 and all of the nodes #1 to #3 enters the active state at the time of the transmission of a signal 515 that is the subsequent beacon. Because an RSSI is not acquired during this CSMA period, only the node that can transmit data, from among the nodes #1 to #3, enters the active state.

In this case, first, the node #1 transmits, to the hub 2, the RSSI table containing the RSSI data and a signal 516 containing the sensing data that are acquired in the previous CSMA period. At this time, the nodes #2 and #3 are in the sleep state.

Subsequently, the node #2 transmits, to the hub 2, a signal 517 that contains the RSSI table sensing data that contains the RSSI data acquired during the previous CSMA period. At this time, the nodes #1 and #3 are in the sleep state.

Lastly, the node #3 transmits, to the hub 2, a signal 518 that contains the RSSI table sensing data that contains the RSSI data acquired during the previous CSMA period. At this time, the nodes #1 and #2 are in the sleep state.

Figure 12:
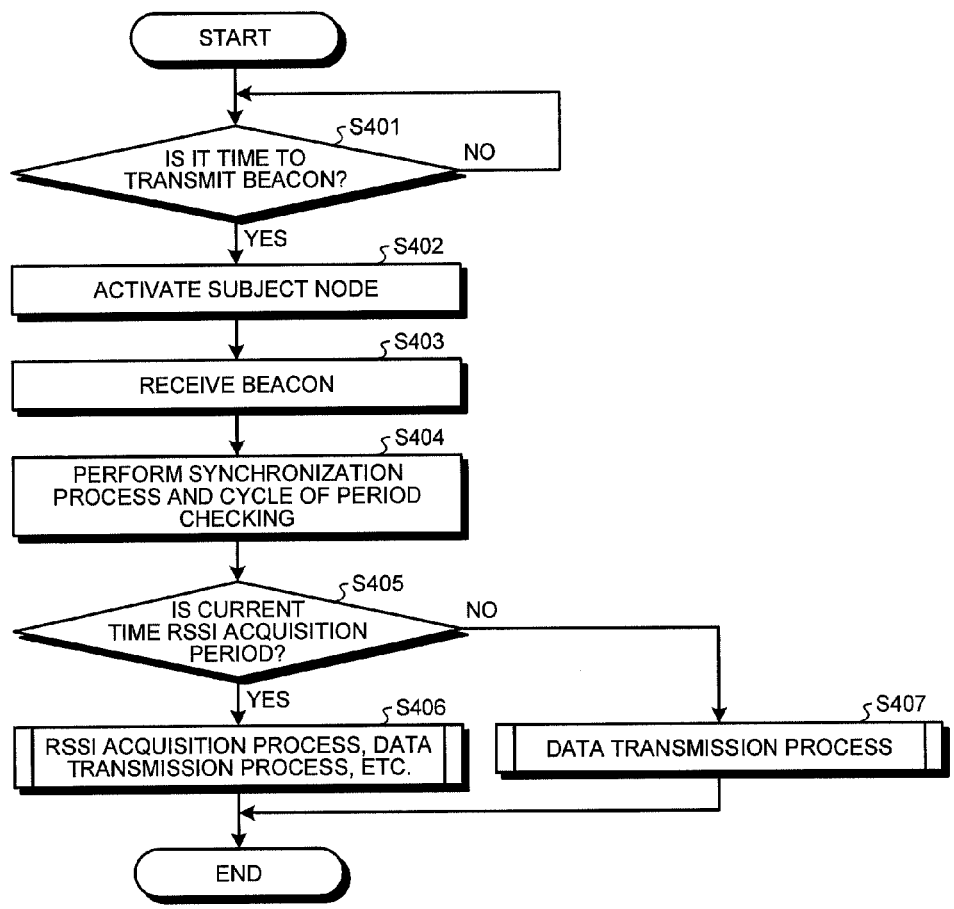
FIG. 12 is a flowchart illustrating the flow of a communication process performed by the wireless communication system according to the second embodiment.
Figure 13:
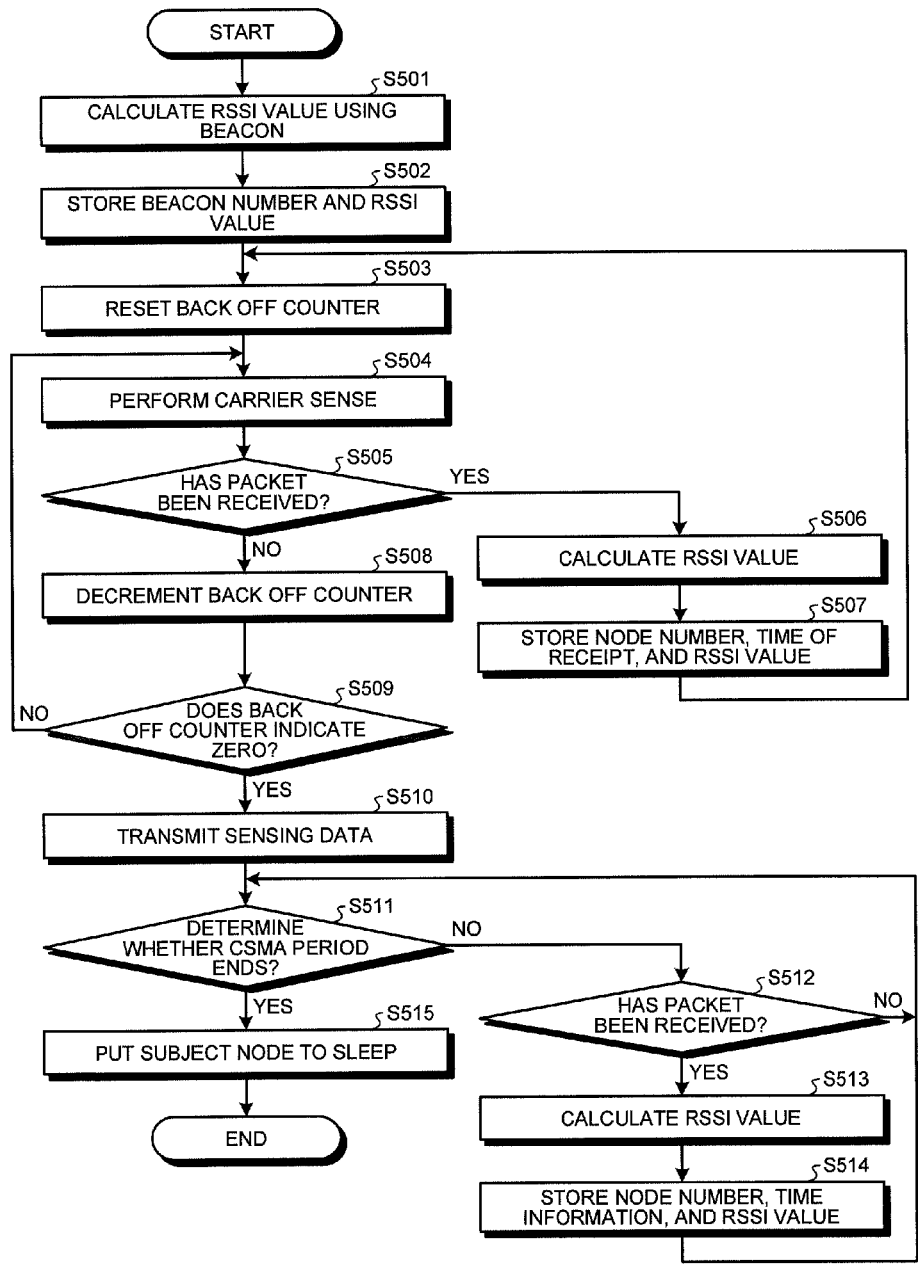
FIG. 13 is a flowchart illustrating the flow of an RSSI acquisition process and a data transmission process performed in the second embodiment.
Figure 14:
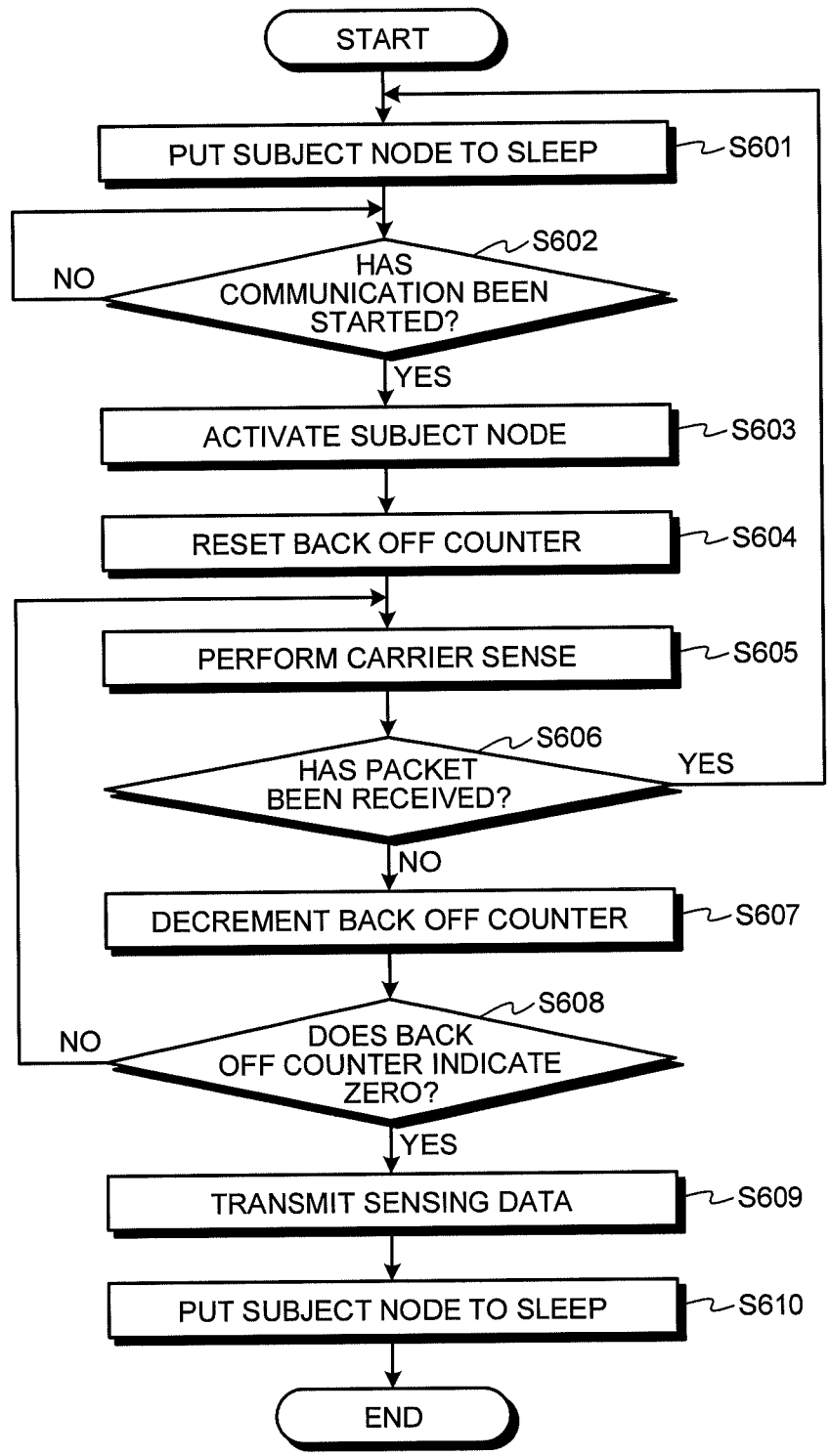
FIG. 14 is a flowchart illustrating the flow of a data transmission process according to the second embodiment.

In the following, the flow of the communication process performed by the wireless communication system according to the second embodiment will be described with reference to FIGS. 12, 13, and 14. FIG. 12 is a flowchart illustrating the flow of a communication process performed by the wireless communication system according to the second embodiment. FIG. 13 is a flowchart illustrating the flow of an RSSI acquisition process and a data transmission process performed in the second embodiment. FIG. 14 is a flowchart illustrating the flow of a data transmission process according to the second embodiment. First, the flow of the overall communication process will be described with reference to FIG. 12. FIG. 12 illustrates the flow of a single communication process starting from the sleep state of the node 1. In practice, the flow of the communication process illustrated in FIG. 12 are repeated until a power source is turned off.

The timer control unit 103 determines if it is time to transmit a beacon notified from the scheduler 102 (Step S401). If it is not time to transmit the beacon (No at Step S401), the timer control unit 103 waits until the beacon is transmitted.

If it time to transmit the beacon (Yes at Step S401), the timer control unit 103 instructs the power supply control unit 104 to supply the electrical power. In response to the instruction to start the electrical power, the power supply control unit 104 turns on the power source to supply the electrical power to each unit, thus activating the subject node (Step S402).

Subsequently, the wireless communication control unit 101 receives the beacon transmitted form the hub 2 (Step S403).

Then, the scheduler 102 receives an input of the beacon from the wireless communication control unit 101. Then, the scheduler 102 acquires, from the beacon, synchronization information and CSMA period information. The timer control unit 103 receives, from the scheduler 102, an input of the synchronization information and the CSMA period information. Then, the timer control unit 103 checks the synchronization process, the cycle of the CSMA period, and the like (Step S404).

Then, the timer control unit 103 determines whether the CSMA period acquired this time is an RSSI acquisition period (Step S405).

If the acquired CSMA period is an RSSI acquisition period (Yes at Step S405), the node 1 performs the RSSI acquisition process and the data transmission process (Step S406). The RSSI acquisition process and the data transmission process performed at Step S406 will be described in detail later with reference to FIG. 13.

In contrast, if the acquired CSMA period is not an RSSI acquisition period (No at Step S405), the node 1 performs the data transmission process (Step S407). The data transmission process performed at Step S407 will be described in detail later with reference to FIG. 14.

In the following, the RSSI acquisition process and the data transmission process performed at Step S406 illustrated in FIG. 12 will be described with reference to FIG. 13.

The RSSI calculating unit 105 receives an input of a beacon and a beacon number from the wireless communication control unit 101. Then, by using the received beacon, the RSSI calculating unit 105 calculates an RSSI value of a signal transmitted from the hub 2 (Step S501).

The memory control unit 108 receives, from the RSSI calculating unit 105, an input of the beacon number and an RSSI value of a signal transmitted from the hub 2. Then, the memory control unit 108 stores, in the storing unit 109 in an associated manner, the beacon number and the RSSI value of the signal from the hub 2 (Step S502).

The wireless communication control unit 101 resets the back off counter (Step S503). Then, the wireless communication control unit 101 performs the carrier sense (Step S504).

The wireless communication control unit 101 determines whether a packet transmitted from a different node is received from the carrier sense (Step S505). If the packet is received (Yes at Step S505), the RSSI calculating unit 105 acquires, from the wireless communication control unit 101, the packet transmitted from the different node. Then, by using the received packet, the RSSI calculating unit 105 calculates an RSSI value of a signal from the node that is the transmission source of the packet (Step S506).

The memory control unit 108 receives, from the RSSI calculating unit 105, an input of the node number, the time of receipt, and the RSSI value. Then, the memory control unit 108 stores, in the storing unit 109 in an associated manner, the node number, the time of receipt, and the RSSI value (Step S507), and returns to Step S503

In contrast, if the packet is not received (No at Step S505), the wireless communication control unit 101 decrements the back off counter (Step S508).

Then, the wireless communication control unit 101 determines whether the back off counter indicates zero (Step S509). If the wireless communication control unit 101 determines that the back off counter does not indicate zero (No at Step S509), the process returns to Step S504.

In contrast, if the back off counter indicates zero (Yes at Step S509), the wireless communication control unit 101 transmits, to the hub 2, the sensing data acquired from the sensor control unit 107 (Step S510).

Then, the timer control unit 103 determines whether the CSMA period ends (Step S511).

If the CSMA period does not end (No at Step S511), the wireless communication control unit 101 determines whether a packet transmitted from a different node is received from the carrier sense (Step S512). If the packet is received (Yes at Step S512), the RSSI calculating unit 105 acquires, from the wireless communication control unit 101, the packet transmitted from the different node. Then, by using the received packet, the RSSI calculating unit 105 calculates an RSSI value of a signal from a node that is the transmission source of the packet (Step S513).

The memory control unit 108 receives, from the RSSI calculating unit 105, an input of the node number, the time of receipt, and the RSSI value. Then, the memory control unit 108 stores, in the storing unit 109 in an associated manner, the node number, the time of receipt, and the RSSI value (Step S514) and returns to Step S511.

In contrast, if the wireless communication control unit 101 determines that a packet is not received (No at Step S512) the process returns to Step S511.

In contrast, if the CSMA period ends (Yes at Step S511), the timer control unit 103 instructs the power supply control unit 104 to stop supplying the electrical power to each unit. Then, the power supply control unit 104 turns off the power source to stop supplying the electrical power to each unit and puts the subject node to sleep (Step S515).

In the following, the data transmission process performed at Step S407 illustrated in FIG. 12 will be described with reference to FIG. 14.

The timer control unit 103 instructs the power supply control unit 104 to stop supplying the electrical power to each unit. Then, the power supply control unit 104 turns off the power supply to stop supplying the electrical power to each unit and puts the subject node to sleep (Step S601).

Then, the timer control unit 103 determines whether communication is started (Step S602). If the communication is not started (No at Step S602), the timer control unit 103 waits until the communication is started.

In contrast, if the communication is started (Yes at Step S602), the timer control unit 103 instructs the power supply control unit 104 to supply the electrical power to each unit. Then, the power supply control unit 104 turns on the power supply to supply the electrical power to each unit, thus activating the subject node (Step S603).

The wireless communication control unit 101 resets the back off counter (Step S604). Then, the wireless communication control unit 101 performs the carrier sense (Step S605).

The wireless communication control unit 101 determines whether a packet transmitted from a different node is received from the carrier sense (Step S606). If the wireless communication control unit 101 determines that a packet is received (Yes at Step S606) the process returns to Step S601.

In contrast, if the packet is not received (No at Step S606), the wireless communication control unit 101 decrements the back off counter (Step S607).

Then, the wireless communication control unit 101 determines whether the back off counter indicates zero (Step S608). If the wireless communication control unit 101 determines that the back off counter does not indicate zero (No at Step S608), the process returns to Step S605.

In contrast, if the back off counter indicates zero (Yes at Step S608), the wireless communication control unit 101 transmits, to the hub 2, the sensing data acquired from the sensor control unit 107 (Step S609).

Then, the power supply control unit 104 turns off the power supply to stop supplying the electrical power to each unit and puts the subject node to sleep (Step S610).

As described above, the wireless communication system according to the second embodiment, even if the CSMA communication is used, it is possible to acquire propagation information on each node while reducing the electrical power consumption. Furthermore, by creating, for example, an RSSI matrix from the propagation information on each node, the relative position of each node can be obtained.

[c] Third Embodiment

In the following, a wireless communication system according to a third embodiment will be described. The wireless communication system according to the third embodiment differs from the first and the second embodiments in that only the RSSI value having a threshold that is greater than a predetermined threshold is transmitted to the hub. Accordingly, in the following, the limitation of the RSSI value to be transmitted will be mainly described. The nodes according to the third embodiment are also represented by the block diagram illustrated in FIG. 1. Furthermore, the hub according to the third embodiment is also represented by the block diagram illustrated in FIG. 4. In the third embodiment, units included in the node and the hub having the same reference numerals as those in the first embodiment have the same function as that described in the first embodiment unless otherwise noted. In particular, the function of the hub is the same as that described in the first embodiment except for the content of a beacon transmitted to a node; therefore, a description other than this will be omitted.

The RSSI table creating unit 106 previously stores therein a threshold of an RSSI value. If an RSSI value is too low when positioning a node, the data thereof is not preferable as the positioning data of the node. Accordingly, the minimum RSSI value capable for the positioning of a node is determined as a threshold in accordance with the operation state of the wireless communication system. Therefore, a threshold is preferably determined in accordance with the operation state of the wireless communication system.

Similarly to the first embodiment, the RSSI table creating unit 106 extracts, from the storing unit 109 via the memory control unit 108, an RSSI value of a signal transmitted from a different node having a node number greater than that of the subject node. Furthermore, the RSSI table creating unit 106 compares the extracted RSSI value with the threshold and extracts an RSSI value that is greater than the threshold.

Then, the RSSI table creating unit 106 creates an RSSI table by using an RSSI value that is greater than the threshold. The creation of the RSSI table in detail is the same as that described in the first embodiment.

Then, the RSSI table creating unit 106 outputs the created RSSI table to the wireless communication control unit 101.

As described above, the wireless communication apparatus according to the third embodiment can prevent an RSSI value that is not preferable for use in positioning from being transmitted to the hub. Accordingly, it is possible to reduce the amount of data transmitted to the hub, and thus reducing the load of the aggregation of RSSI data applied on the network.

Furthermore, in the third embodiment, an RSSI value is used for a threshold as a method of limiting the RSSI value to be transmitted. However, another value may also be used as long as data that is unpreferable for use in positioning is distinguished. For example, it may also be possible to use a variance of an RSSI value or to use, in combination, an RSSI value and a variance. For example, when using a variance, it is conceivable that a variance, in which a radio wave is expected to be unstable, is set as a threshold and an RSSI value having a variance smaller than the threshold is transmitted to the hub.

Furthermore, in the third embodiment, a description has been given based on the first embodiment; however, it may also be possible to add the configuration of the third embodiment to the second embodiment.

[d] Fourth Embodiment

Figures 15, 16:
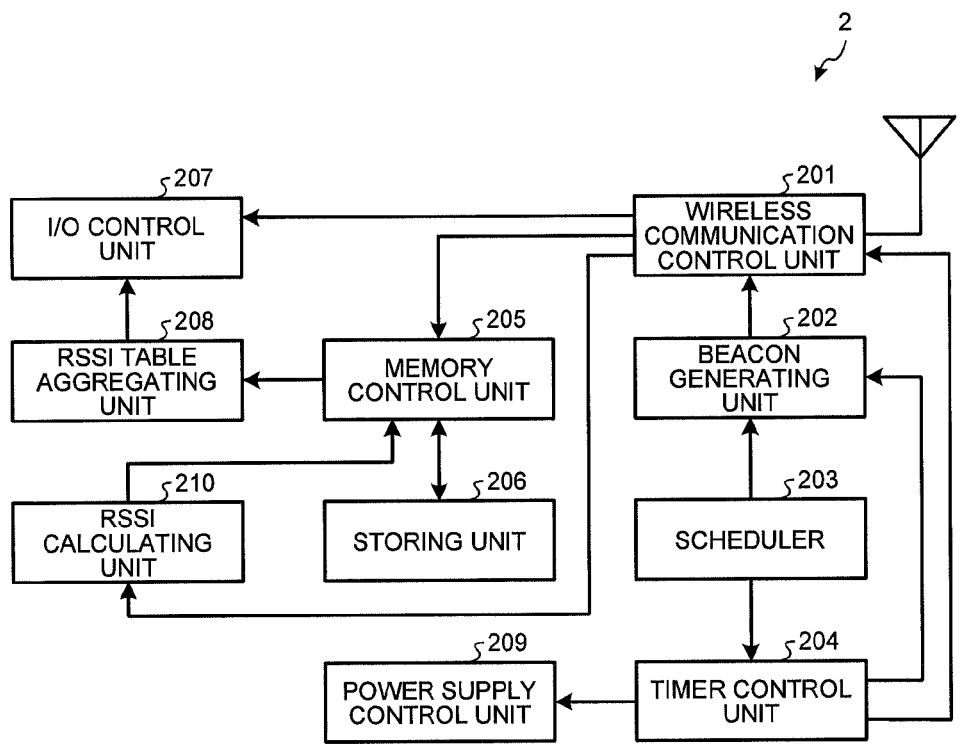
FIG. 15 is a block diagram illustrating the function of a hub according to a fourth embodiment.
FIG. 16 is a schematic diagram illustrating an example of an expansion RSSI matrix.

In the following, a wireless communication apparatus according to a fourth embodiment will be described. The wireless communication apparatus according to the fourth embodiment differs from the first embodiment in that, when creating an RSSI matrix, each RSSI value is corrected to normalize transmission electrical power. Accordingly, in the following, the creation of an RSSI matrix will be mainly described. The nodes according to the fourth embodiment are also represented by the block diagram illustrated in FIG. 1. In contrast, a hub according to the fourth embodiment is represented by the block diagram illustrated in FIG. 15. FIG. 15 is a block diagram illustrating the function of a hub according to a fourth embodiment. In the fourth embodiment, units included in the nodes and the hub having the same reference numerals as those in the first embodiment have the same function as that described in the first embodiment unless otherwise noted. In particular, the function of the node is the same as that the first embodiment; therefore, a description thereof will be omitted.

As illustrated in FIG. 15, the hub 2 according to the fourth embodiment includes an RSSI calculating unit 210 in addition to the configuration described in the first embodiment.

The RSSI calculating unit 210 receives, from the wireless communication control unit 201, an input of a signal transmitted from each node 1. Then, the RSSI calculating unit 210 calculates an RSSI value of the received signal. Specifically, the RSSI calculating unit 210 calculates an RSSI value of each signal transmitted from each node 1 to the hub 2. In the following, an RSSI value of a signal transmitted from each node 1 to the hub 2 is referred to as a "slave-to-master RSSI value". Then, the RSSI calculating unit 210 outputs, to the memory control unit 205 together with a store instruction to the storing unit 206, the calculated slave-to-master RSSI value and a node number of the transmission source of a packet derived from the slave-to-master RSSI value.

The memory control unit 205 stores, in the storing unit 206, an RSSI table transmitted from each node 1 received from the wireless communication control unit 201. Furthermore, the memory control unit 205 stores, in the storing unit 206 in an associated manner, the slave-to-master RSSI values and the node numbers received from the RSSI calculating unit 210.

After receiving RSSIs from all of the nodes 1, which are the slave stations of the hub 2, the RSSI table aggregating unit 208 acquires, from the storing unit 206 via the memory control unit 205, all of the stored RSSI tables, the slave-to-master RSSI values, and the node numbers associated with the slave-to-master RSSI values.

The RSSI table aggregating unit 208 acquires, from a RSSI table, an RSSI value of a signal that is transmitted from the hub 2 and that is received by the node 1 that transmits the subject RSSI table. Hereinafter, an RSSI value of a signal transmitted from the hub 2 received by the node 1 is referred to as a "master-to-slave RSSI value".

Here, transmission electrical power of each node 1 may sometimes not be uniform. If the transmission electrical power of each node 1 are not uniform, an RSSI value of a signal transmitted from the node 1 having large electrical power becomes large, whereas an RSSI value of a signal transmitted from the node 1 having small electrical power becomes small. In this way, if the transmission electrical power is not uniform, because an RSSI value affects the transmission electrical power of each node, accurate positioning is not performed if the acquired RSSI value is used without processing anything. Accordingly, to eliminate the effect of the transmission electrical power from an RSSI value, the RSSI table aggregating unit 208 according to the fourth embodiment calculates a correction value used to normalize the transmission electrical power. Then, after each of the RSSI values are corrected using the correction value, the RSSI table aggregating unit 208 creates an RSSI matrix.

In the following, the calculation of a correction value and the creation of an RSSI matrix performed by the RSSI table aggregating unit 208 will be described. Here, by using "0" as an additional number representing the hub 2, a slave-to-master RSSI value is defined as $SO_i$ (i is a node number and i=1, 2, . . . , and n). Furthermore, a master-to-slave RSSI value is defined as Si0. Furthermore, in the fourth embodiment, similarly to the first embodiment, it is assumed that each RSSI table contains an RSSI value of a signal transmitted from a node whose node number is greater than that of a node that creates the corresponding RSSI table. Specifically, the RSSI table aggregating unit 208 can acquire, from each RSSI table, Sij (i, j=1, 2, . . . , and n, and i<j).

The RSSI table aggregating unit 208 creates an expansion RSSI matrix 410 illustrated in FIG. 16 from the acquired Si0 (i=1, 2, . . . , and n), S0i (i=1, 2, . . . , and n), and Sij (i,j=1, 2, . . . , and n, and i<j). FIG. 16 is a schematic diagram illustrating an example of an expansion RSSI matrix.

Then, by using the slave-to-master RSSI value (S0i) and the master-to-slave RSSI value (Si0) and by using the duality of the radio wave, the RSSI table aggregating unit 208 calculates a correction value Δi to normalize the transmission electrical power. Specifically, the RSSI table aggregating unit 208 calculates a correction value Δi by subtracting the master-to-slave RSSI value (Si0) from the slave-to-master RSSI value (S0i), i.e., Δi=S0i−Si0. If the hub 2 and the node 1 have the same transmission electrical power, the RSSI values are to be the same based on the duality of the radio wave and thus the difference is to be zero. If the transmission electrical power of the node 1 is different from that of the hub 2, the difference therebetween is Δi. Accordingly, by using the transmission electrical power of the hub 2 as a reference, the transmission electrical power of each node 1 can be normalized.

Then, the RSSI table aggregating unit 208 performs the correction by using a correction value Δi with respect to each Sij (i,j=1, 2, . . . , and n, and i<j). Specifically, the RSSI table aggregating unit 208 calculates Sij' by subtracting the correction value Δi from each Sij (i,j=1, 2, . . . , and n, and i<j), i.e., Sij'=Sij−Δi. Accordingly, by using the calculated Sij', the RSSI table aggregating unit 208 creates an RSSI matrix similar to the matrix 401 illustrated in FIG. 5.

Then, similarly to the first embodiment, by using the duality of the radio wave, the RSSI table aggregating unit 208 completes the RSSI matrix using Sij'=Sji'.

Thereafter, the RSSI table aggregating unit 208 transmits the created RSSI matrix to an upper level server via the I/O control unit 207.

As described above, the wireless communication system according to the fourth embodiment creates an RSSI matrix by using an RSSI value obtained by normalizing the transmission electrical power of each node. Accordingly, it is possible to create an RSSI matrix in which the effect of the transmission electrical power of each node is eliminated. Therefore, it is possible to more accurately perform the positioning of each node.

Furthermore, in the fourth embodiment, a description has been given based on the first embodiment; however, it may also be possible to add the configuration of the fourth embodiment to the second and the third embodiments.

[f] Fifth Embodiment

In the following, a wireless communication system according to a fifth embodiment will be described. The wireless communication system according to the fifth embodiment differs from the first embodiment in that data is transmitted to the hub by reducing the number of bits of data on the RSSI value. Accordingly, in the following, the reduction of the number of bits of the node and the creation of an RSSI matrix of the hub will be mainly described. The node according to the fifth embodiment are also represented by the block diagram illustrated in FIG. 1. Furthermore, the hub according to the fifth embodiment is also represented by the block diagram illustrated in FIG. 4. In the fifth embodiment, units included in the node and the hub having the same reference numerals as those in the first embodiment have the same function as that described in the first embodiment unless otherwise noted.

Furthermore, in the following, a description will be given of using, as an example, a node #i. Specifically, the suffix "i" of Sij representing an RSSI value represents the subject node.

The RSSI table creating unit 106 acquires, from the storing unit 109 via the memory control unit 108, Sij (i<j) and acquires, from the hub 2, an RSSI (hereinafter, referred to as "Si0") of a signal transmitted to the subject node.

Then, the RSSI table creating unit 106 calculates the difference Dij between Sij and Si0, i.e., Dij=Sij−Si0.

Subsequently, the RSSI table creating unit 106 deletes high-order 1 bit in Dij to obtain Dij'. In a system, such as Zigbee (registered trademark) or the Wi-Fi (registered trademark), an RSSI value is represented by 1-dB resolution and 8 bits (0 to 255). However, in practice, the dynamic range of a signal that can be received by the node 1 and the hub 2 is a maximum of 80 dB. Accordingly, if the normalization is properly performed, an RSSI value can also be represented by 7 bits. Accordingly, in the fifth embodiment, 1 bit is deleted. However, it is possible to further delete the number of bits as the dynamic range of a signal decreases. The number of bits to be deleted is preferably set in accordance with the environment of the wireless communication system. For example, it is possible to delete 2 bits from Dij if the dynamic range of a signal is equal to or less than 64 bits.

Then, the RSSI table creating unit 106 creates an RSSI table by using Dij' as a value representing an RSSI. As described in the first embodiment, this RSSI table contains Si0 that is an RSSI of a signal that is transmitted from the hub 2 to the subject node and that is acquired using a beacon. Then, the RSSI table is transmitted to the hub 2 by the wireless communication control unit 101.

In the following, an RSSI matrix of the hub 2 created by the RSSI table aggregating unit 208 will be described.

If RSSI tables are stored in the storing unit 206 from all of the nodes 1 that are the slave stations of the hub 2, the RSSI table aggregating unit 208 acquires the RSSI tables via the memory control unit 205.

Then, the RSSI table aggregating unit 208 acquires Dij', from each of the RSSI tables. Furthermore, the RSSI table aggregating unit 208 acquires S0i from each of the RSSI tables.

Subsequently, the RSSI table aggregating unit 208 adds S0i to Dij' and restores it to the absolute value data Sij'. In other words, the calculation of Sij"=Dij'+S0i is performed.

Then, similarly to the first embodiment, by using the duality of the radio wave, the RSSI table aggregating unit 208 completes an RSSI matrix using Sij"=Sji".

Thereafter, the RSSI table aggregating unit 208 transmits the created RSSI matrix to the upper level server via the I/O control unit 207.

As described above, the wireless communication system according to the fifth embodiment can perform the transmission, to the hub, by reducing the number of bits of the RSSI to be transmitted. Accordingly, it is possible to further reduce the amount of data transmitted to the hub, thus reducing the load of the aggregation of RSSI data applied to the network.

Furthermore, in the fifth embodiment, a description has been given based on the first embodiment; however, it may also be possible to add the configuration of the fifth embodiment to any of the second to the fourth embodiments.

Furthermore, similarly to the first embodiment, in the second to the fifth embodiments, propagation information other than RSSI may also be used as long as information indicates a propagation path. For example, it may also be possible to use a propagation delay corresponding to the distance between nodes or the Doppler shift corresponding to the relative velocity between nodes.

Hardware Configuration

Figure 17:
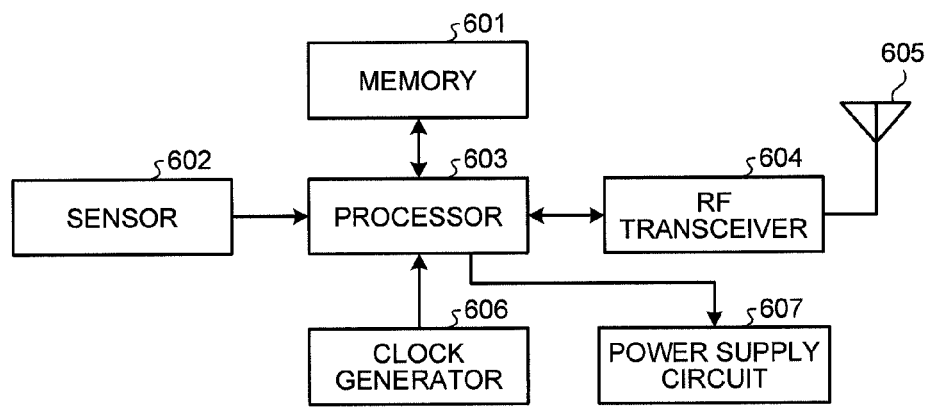
FIG. 17 is a schematic diagram illustrating the hardware configuration of a node.
Figure 18:
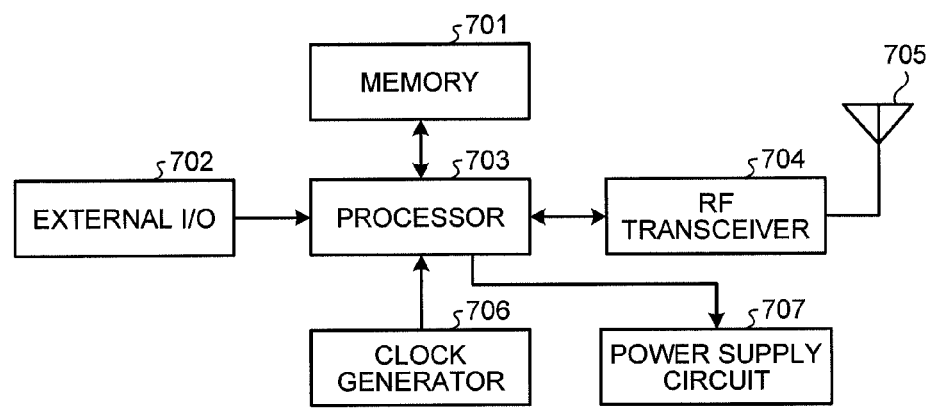
FIG. 18 is a schematic diagram illustrating the hardware configuration of a hub.

In the following, the hardware configuration of the node and the hub according to each embodiment will be described with reference to FIGS. 17 and 18. FIG. 17 is a schematic diagram illustrating the hardware configuration of a node. FIG. 18 is a schematic diagram illustrating the hardware configuration of a hub.

As illustrated in FIG. 17, the node according to the above embodiments includes a memory 601, a sensor 602, a processor 603, an RF transceiver 604, a clock generator 606, and a power supply circuit 607.

The memory 601, the sensor 602, the RF transceiver 604, an antenna 605, the clock generator 606, and the power supply circuit 607 are each connected to the processor 603. Furthermore, the antenna 605 is connected to the RF transceiver 604.

The memory 601 is a storage device and implements the function of, for example, the storing unit 109 illustrated in FIG. 1. Furthermore, the memory 601 stores therein various programs that implement processes performed by the wireless communication control unit 101, the scheduler 102, the timer control unit 103, the RSSI calculating unit 105, the RSSI table creating unit 106, the sensor control unit 107, the memory control unit 108, and the like illustrated in FIG. 1.

The RF transceiver 604 communicates with the hub 2 via the antenna 605. For example, the RF transceiver 604, the processor 603, and the memory 601 implement the function of the wireless communication control unit 101 illustrated in FIG. 1.

The clock generator 606 creates a clock that is used as a reference of the operation. For example, the clock generator 606, the processor 603, and the memory 601 implement the function of the timer control unit 103 illustrated in FIG. 1.

The power supply circuit 607 is a circuit that supplies electrical power to each unit. For example, the power supply circuit 607, the processor 603, and the memory 601 implement the function of the power supply control unit 104 illustrated in FIG. 1.

The sensor 602 detects predetermined information, such as biometric information. For example, the sensor 602, the processor 603, and the memory 601 implement the function of the sensor control unit 107 illustrated in FIG. 1.

Furthermore, the processor 603 and the memory 601 implement the function of, for example, the scheduler 102, the RSSI calculating unit 105, the RSSI table creating unit 106, and the memory control unit 108 illustrated in FIG. 1.

For example, the processor 603 reads various programs stored in the memory 601 and creates, in the memory 601, processes that implement various functions. Then, the processor 603 performs various processes by performing, together with each unit, the processes created in the memory 601.

As illustrated in FIG. 18, the hub according to the above embodiments includes a memory 701, an external I/O 702, a processor 703, an RF transceiver 704, an antenna 705, a clock generator 706, and a power supply circuit 707.

The memory 701, the external I/O 702, the RF transceiver 704, the clock generator 706, and the power supply circuit 707 are each connected to the processor 703. Furthermore, the antenna 705 is connected to the RF transceiver 704.

The memory 701 is a storage device and implements the function of, for example, the storing unit 206 illustrated in FIG. 4. Furthermore, the memory 701 stores therein various programs that implements processes performed by the wireless communication control unit 201, the beacon generating unit 202, the timer control unit 204, the memory control unit 205, the I/O control unit 207, the RSSI table aggregating unit 208, and the like illustrated in FIG. 4.

The RF transceiver 704 communicates with the node 1 via the antenna 705. For example, the RF transceiver 704, the processor 703, and the memory 701 implement the function of the wireless communication control unit 201 illustrated in FIG. 4.

The clock generator 706 creates a clock that is used as a reference of the operation. For example, the clock generator 706, the processor 703, and the memory 701 implement the function of the timer control unit 204 illustrated in FIG. 4.

The power supply circuit 707 is a circuit that supplies electrical power to each unit. For example, the power supply circuit 707, the processor 703, and the memory 701 implement the function of the power supply control unit 209 illustrated in FIG. 4.

The external I/O 702 detects predetermined information, such as biometric information. For example, the external I/O 702, the processor 703, and the memory 701 implement the function of the I/O control unit 207 illustrated in FIG. 4.

Furthermore, the processor 703 and the memory 701 implement the function of, for example, the beacon generating unit 202, the scheduler 203, the timer control unit 204, the memory control unit 205, the RSSI table aggregating unit 208, and the like illustrated in FIG. 4.

For example, the processor 703 reads various programs stored in the memory 701 and creates, in the memory 701, processes that implement various functions. Then, the processor 703 performs various processes by performing, together with each unit, the processes created in the memory 701.

According to an aspect of the wireless communication system, the slave station device, the master station device, and the wireless communication system control method disclosed in the present invention, an advantage is provided in that positioning of each node can be easily performed while reducing the electrical power consumption of the entire network.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A wireless communication system comprising:
a master station and multiple slave stations,
wherein each of the multiple slave stations includes a first processor that executes a first process including:
acquiring, during a predetermined communication time period, a signal transmitted to the master station by another of the multiple slave stations,
calculating, from the acquired signal, propagation information on propagation between the slave station and the another of the multiple slave stations, extracting a different slave station in accordance with a predetermined rule that avoids predetermined duplication of propagation information, and transmitting the calculated propagation information based on a signal transmitted by the extracted different slave station to the master station, and wherein the master station includes a second processor that executes a second process including:

receiving propagation information transmitted by each of the multiple slave stations, and aggregating the received propagation information.

2. The wireless communication system according to claim 1, wherein the second process further includes notifying each of the multiple slave stations of allocation of a different predetermined communication time period, the first process further includes receiving the predetermined communication time period notified from the master station, and acquiring, based on the predetermined communication time period received, during the predetermined communication time period allocated to the another of the multiple slave stations, the signal transmitted to the master station by the another of the multiple slave stations.

3. The wireless communication system according to claim 1, wherein second process further includes notifying notifies each of the multiple slave stations of allocation of the predetermined communication time period that is common to the multiple slave stations, the first processor receives the predetermined communication time period notified from the master station, and acquiring, during the predetermined communication time period received, the signal transmitted to the master station by the another of the multiple slave stations.

4. The wireless communication system according to claim 1, wherein each of the multiple slave stations has a node number that represents each corresponding slave station, and the transmitting includes extracting a slave station that has a node number greater than a node number of the slave station.

5. The wireless communication system according to claim 1, wherein each of the multiple slave stations has a node number that represents each corresponding slave station, and the transmitting includes extracting a slave station having a node number, which is one of an even number and an odd number and is greater than a node number of the slave station, and extracting a slave station having a node number, which is the other one of the even number and the odd number and is less than the node number of the slave station.

6. The wireless communication system according to claim 1, wherein each of the multiple slave stations includes a node number that represents each corresponding slave station, and the transmitting includes specifying propagation information other than propagation information obtained based on a signal which is transmitted from the slave station, from the propagation information calculated, and extracting a slave station that transmits a signal that contains the specified propagation information.

7. The wireless communication system according to claim 1, wherein the second process further includes calculating, based on a signal transmitted from each of the multiple slave stations to the slave station, master-to-slave propagation information that is the propagation information on the signal transmitted from each of the multiple slave stations, calculating the master-to-slave propagation information based on the signal received from the master station, transmitting the master-to-slave propagation information calculated to the master station, and calculating a correction value by using the master-to-slave propagation information received from each of the multiple slave stations and by using the master-to-slave propagation information calculated and using, as the propagation information, a value obtained by correcting, based on the calculated correction value, the propagation information received from each of the multiple slave stations.

8. The wireless communication system according to claim 1, wherein the calculating includes calculating the master-to-slave propagation information based on the signal received from the master station, and transmitting, based on a difference between the master-to-slave propagation information and the propagation information on the propagation between the slave station and another the slave station, propagation information in which a bit width is reduced by deleting a high-order bit in the propagation information, to the master station.

9. The wireless communication system according to claim 1, wherein the propagation information is one of a received signal strength indication and a relative value, between the multiple slave stations, of Doppler frequency or of a signal delay time.

10. The wireless communication system according to claim 1, wherein the calculating includes acquiring a received signal strength indication as the propagation information, and limiting the received signal strength indication that is transmitted to the master station to a predetermined indication based on a size and a variance value of the received signal strength indication.

11. The wireless communication system according to claim 1, wherein the second process further includes the distance between each of the multiple slave stations.

12. A wireless communication system control method used in a wireless communication system that includes a master station and multiple slave stations, the method comprising:

acquiring, by each of the multiple slave stations during a predetermined communication time period, a signal that is transmitted to the master station by another of the multiple slave stations, calculating, by each of the multiple slave stations, from the acquired signal, propagation information on propagation between the slave station and the another of the multiple slave stations, extracting a different slave station in accordance with a predetermined rule that avoids predetermined duplication of propagation information, and transmitting the calculated propagation information based on a signal transmitted by the extracted different slave station to the master station;

receiving, by the master station, the propagation information transmitted by each of the multiple slave stations; and obtaining, by the master station, a distance between each of the multiple slave stations based on the received propagation information.

13. A slave station device comprising:
a processor that executes a process including:
acquiring, during a predetermined communication time period, a signal that is transmitted to a master station device by another slave station device that is a different from the slave station device;
calculating, from the acquired signal, propagation information on propagation between the slave station device and the another slave station device; and
extracting a different slave station in accordance with a predetermined rule that avoids predetermined duplication of propagation information, and
transmitting the calculated propagation information based on a signal transmitted by the extracted different slave station to the master station device.

14. A master station device for multiple slave station devices, the master station device comprising:
a processor that executes a process including:
receiving propagation information transmitted by each of the multiple slave station devices,
wherein each of the multiple slave station devices acquires, during a predetermined communication time period, a signal transmitted to the master station device by another slave station device that is different from a first slave station device,
wherein each of the multiple slave station devices calculates, from the signal acquired by each of the multiple slave station, the propagation information on propagation between the another slave station device and the first slave station device based on the assumed signal,
wherein each of the multiple slave station devices extracts a different slave station in accordance with a predetermined rule that avoids predetermined duplication of propagation information, and
wherein the calculated propagation information based on a signal transmitted by the extracted different slave station for each of the multiple slave station devices is transmitted to the master station device; and
aggregating the received propagation information for the multiple slave station devices.

* * * * *